(12) United States Patent
Park

(10) Patent No.: US 11,243,713 B2
(45) Date of Patent: Feb. 8, 2022

(54) APPARATUS AND METHOD FOR PROCESSING DATA IN MEMORY SYSTEM

(71) Applicant: SK hynix Inc., Gyeonggi-do (KR)

(72) Inventor: Jong-Ju Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 161 days.

(21) Appl. No.: 16/387,203

(22) Filed: Apr. 17, 2019

(65) Prior Publication Data

US 2020/0081656 A1 Mar. 12, 2020

(30) Foreign Application Priority Data

Sep. 10, 2018 (KR) .................. 10-2018-0107820

(51) Int. Cl.
*G06F 12/00* (2006.01)
*G06F 3/06* (2006.01)
(52) U.S. Cl.
CPC .......... *G06F 3/0659* (2013.01); *G06F 3/0611* (2013.01); *G06F 3/0673* (2013.01)
(58) Field of Classification Search
CPC ..... G06F 3/0611; G06F 3/0659; G06F 3/0614
See application file for complete search history.

(56) References Cited

U.S. PATENT DOCUMENTS

2019/0220404 A1* 7/2019 Hwang ............... G06F 12/0253

FOREIGN PATENT DOCUMENTS

KR 10-2014-0080216 6/2014

* cited by examiner

*Primary Examiner* — Baboucarr Faal
(74) *Attorney, Agent, or Firm* — IP & T Group LLP

(57) ABSTRACT

A memory system includes at least one memory device, including plural planes, each capable of storing data; and a controller coupled with the at least one memory device via plural channels and plural ways and suitable for transmitting data to the at least one memory device for a read operation or a write operation in response to a transmission order. The plural planes can include plural blocks respectively. The plural blocks can include multi-level cells respectively. The controller can include a mapping circuitry for determining the transmission order of the data based on a first order of the plural channels, a second order of the plural planes, a third order of the plural ways and a fourth order of bits stored in the multi-level cells.

19 Claims, 20 Drawing Sheets

APPARATUS AND METHOD FOR PROCESSING DATA IN MEMORY SYSTEM

CROSS-REFERENCE TO RELATED APPLICATION

This patent application claims priority to Korean Patent Application No. 10-2018-0107820, filed on Sep. 10, 2018, the entire disclosure of which is incorporated herein by reference.

TECHNICAL FIELD

Various embodiments of the disclosure generally relate to a memory system. Particularly, the embodiments relate to an apparatus and a method for data transmission within a memory system including plural channels and plural ways.

BACKGROUND

Recently, the computer environment paradigm has shifted to ubiquitous computing, which enables a computer system to be used anytime and everywhere. As a result, the use of portable electronic devices such as mobile phones, digital cameras, notebook computers and the like have been rapidly increasing. Such portable electronic devices typically use or include a memory system that uses or embeds at least one memory device, i.e., a data storage device. The data storage device can be used as a main storage device or an auxiliary storage device of a portable electronic device.

Unlike characteristics of a hard disk, a data storage device using a nonvolatile semiconductor memory device has advantages such as excellent stability and durability, because it has no mechanical driving part (e.g., a mechanical arm), and has high data access speed and low power consumption. Examples of a memory system having such advantages, are a data storage device includes a USB (Universal Serial Bus) memory device, a memory card having various interfaces, a solid state drive (SSD) or the like.

SUMMARY

Embodiments of the invention provide a memory system, a data processing system, and an operation process or a method, which can quickly and reliably process data into a memory device by reducing operational complexity and performance degradation of the memory system, and enhancing usage efficiency of the memory device.

The disclosure can show a system and a method for speeding up data transmission between at least one memory device and a host which are engaged with a memory system, or between the at least one memory device and a controller included in the memory system, via a plurality of channels or a plurality of ways included in a memory system. It is possible to provide a method and an apparatus which can reduce noise and interference due to data transfer while speedily transferring data in the memory system.

The disclosure can provide a method and apparatus implemented with a memory system or a host and capable of reducing data interference via a plurality of data paths in the memory system, or between the memory system and host, to decrease a time spent on reading or programming voluminous data.

In an embodiment, a memory system can include at least one memory device, including plural planes, each capable of storing data; and a controller coupled with the at least one memory device via plural channels and plural ways, and suitable for transmitting data to the at least one memory device for a read operation or a write operation in response to a transmission order. The plural planes can include plural blocks respectively and the plural blocks include multi-level cells respectively. The controller can include a mapping circuitry configured to determine the transmission order of the data based on a first order of the plural channels, a second order of the plural planes, a third order of the plural ways and a fourth order of bits stored in the multi-level cells.

By way of example but not limitation, the controller can set a predetermined number of planes in the plural planes as a logical storage unit. The read operation or the write operation can be performed on a basis of logical storage unit. The mapping circuitry can sequentially determine the transmission order in response to the first to fourth orders in each logical storage unit.

The at least one memory device can include a first buffer for temporarily storing data having a size corresponding to that of the logical storage unit. The controller includes a second buffer for storing larger data than that of the first buffer.

In an embodiment, the mapping circuitry can change the first order after the data are transmitted based on the second order. The mapping circuitry can change the third order after the data are transmitted based on the first order, and change the fourth order after the data are transmitted based on the third order.

In another embodiment, the mapping circuitry can change the fourth order after the data are transmitted based on the first order, and change the third order after the data are transmitted based on the fourth order.

In an embodiment, the mapping circuitry can change the second order after the data are transmitted based on the first order. The mapping circuitry can change the third order after the data are transmitted based on the second order, and changes the fourth order after the data are transmitted based on the third order.

In another embodiment, the mapping circuitry changes the fourth order after the data are transmitted based on the second order, and changes the third order after the data are transmitted based on the fourth order.

By way of example but not limitation, the mapping circuitry can be included in a memory interface engaged with the at least one memory device.

In an embodiment, the mapping circuitry can be included in a host interface engaged with a host or an external device.

In another embodiment, a method for operating a memory system can include determining a transmission order of data based on a first order of plural channels, a second order of plural planes, a third order of plural ways and a fourth order of bits stored in multi-level cells; and transmitting the data to the at least one memory device in response to the transmission order. The memory system can include at least one memory device, each including plural planes, capable of storing data, and a controller coupled with the at least one memory device via plural channels and plural ways, and suitable for performing a read operation or a write operation, wherein the plural planes include plural blocks respectively and the plural blocks include multi-level cells respectively.

By way of example but not limitation, the method can further include setting a predetermined number of planes in the plural planes as a logical storage unit, and performing the read operation or the write operation on a basis of logical storage unit.

The transmission order can be determined sequentially in response to the first to fourth orders in each logical storage unit.

For example, in the transmission order, the first order is changed after the data are transmitted based on the second order. In another example, in the transmission order, the second order is changed after the data are transmitted based on the first order.

By way of example but not limitation, in the transmission order, the third order is changed after the data are transmitted based on the second order, and the fourth order is changed after the data are transmitted based on the third order.

For another example, in the transmission order, the fourth order is changed after the data are transmitted based on the second order, and the third order is changed after the data are transmitted based on the fourth order.

The transmission order determined based on the first to fourth orders can be varied according to a size of data transmitted from or to the at least one memory device.

In another embodiment, a memory system can include plural channels, each including plural ways; a memory device including plural dies operatively coupled to corresponding ones among the ways and each having plural planes of multi-level cells configuring logical multi-level pages; and a controller operatively coupled to the channels and configured to access, on a basis of a logical storage unit amounting to a predetermined number of planes, the multi-level cells according to an access hierarchy of the channels, the planes, the logical multi-level pages and the ways in the order listed.

In another embodiment, a memory system can include plural channels, each including plural ways; a memory device including plural dies operatively coupled to corresponding ones among the ways and each having plural planes of multi-level cells configuring logical multi-level pages; and a controller operatively coupled to the channels and configured to access, on a basis of a logical storage unit amounting to a predetermined number of planes, the multi-level cells according to an access hierarchy of the channels, the planes, the ways and the logical multi-level pages in the order listed.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
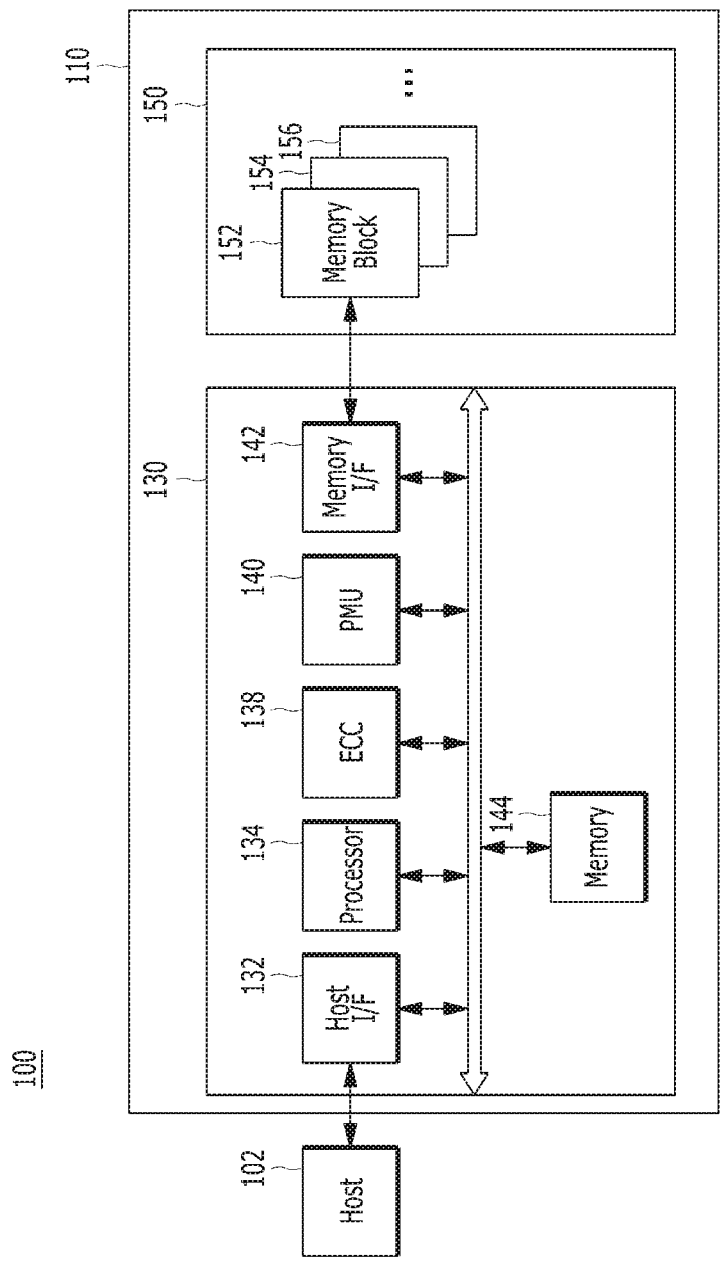
FIG. 1 is a block diagram illustrating an example of a data processing system including a memory system in accordance with an embodiment of the disclosure.

Various examples of the disclosure are described below in more detail with reference to the accompanying drawings. The disclosure may be embodied in other embodiments, forms and variations thereof and should not be construed as being limited to the embodiments set forth herein. Rather, the described embodiments are provided so that this disclosure is thorough and complete, and will fully convey the disclosure to those skilled in the art to which this invention pertains. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to describe various elements, these elements are not limited by these terms. These terms are used to distinguish one element from another element that otherwise have the same or similar names. Thus, a first element in one instance may be referred to as a second or third element in another instance without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements. Communication between two elements, whether directly or indirectly connected/coupled, may be wired or wireless, unless the context indicates otherwise. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention.

As used herein, singular forms are intended to include the plural forms and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the disclosure pertains in view of the present disclosure. It will be further understood that terms, such as those defined in commonly used dictionaries, should be interpreted as having a meaning that is consistent with their meaning in the context of the disclosure and the relevant art, and will not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure will be described in detail with reference to the accompanied drawings.

In FIG. 1, a data processing system 100 in accordance with an embodiment of the disclosure is described. Referring to FIG. 1, the data processing system 100 may include a host 102 engaged or operatively coupled with a memory system 110.

The host 102 may include, for example, a portable electronic device such as a mobile phone, an MP3 player and a laptop computer, or an electronic device such as a desktop computer, a game player, a television (TV), a projector and the like.

The host 102 also includes at least one operating system (OS), which can generally adjust and control functions and operations performed in the host 102. The OS can provide interoperability between the host 102 engaged with the memory system 110 and the user needing and using the memory system 110. The OS may support functions and operations corresponding to user's requests. By way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, and includes Windows servers, Linux, Unix and the like. Further, the mobile operating system may include an Android, an iOS, a Windows mobile and the like. The mobile operating system may be subject to support services or functions for mobility (e.g., a power saving function). The host 102 may include a plurality of operating systems. The host 102 may execute multiple operating systems interlocked with the memory system 110, corresponding to user's request. The host 102 may transmit a plurality of commands corresponding to user's requests into the memory system 110, thereby performing operations corresponding to commands within the memory system 110. Handling plural commands in the memory system 110 is described later, referring to FIGS. 6 and 7.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in the various types of memory systems as exemplified above.

By way of example but not limitation, the controller 130 and the memory device 150 may be integrated into a single semiconductor device. Such integration may improve operation speed. When the memory system 110 is used as an SSD, the operating speed of the host 102 connected to the memory system 110 can be improved to a greater extent than that of the host 102 when the memory system 110 is implemented with a hard disk. In another embodiment, the controller 130 and the memory device 150 may be integrated into one semiconductor device to form a memory card, e.g., a PC card (PCMCIA), a compact flash card (CF), a memory card such as a smart media card (SM, SMC), a memory stick, a multimedia card (MMC, RS-MMC, MMCmicro), a SD card (SD, miniSD, microSD, SDHC), a universal flash memory and the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device that retains data stored therein even while electrical power is not supplied. The memory device 150 may store data provided from the host 102 through a write operation, while providing data stored therein to the host 102 through a read operation. The memory device 150 may include a plurality of memory blocks 152, 154, 156 . . . , each of which may include a plurality of pages. Each of the plurality of pages may include a plurality of memory cells to which a word line (WL) is electrically coupled. The memory device 150 also includes a plurality of memory dies including a plurality of planes, each of which includes a plurality of planes, each of which includes a plurality of memory blocks 152, 154, 156 . . . . In addition, the memory device 150 may be a non-volatile memory device, for example a flash memory, wherein the flash memory may be a three dimensional stack structure.

A structure of the memory device 150 and/or a three-dimensional solid stack structure of the memory device 150 will be described in more detail below with reference to FIGS. 3 to 5. The memory device 150 including a plurality of memory dies each including a plurality of planes each including the plurality of memory blocks 152, 154, 156 . . . will be described in more detail in FIG. 6. Thus, detailed description thereof is omitted here.

The controller 130 may control overall operations of the memory device 150, such as read, write, program, and erase operations. For example, the controller 130 may control the memory device 150 in response to a request from the host 102. The controller 130 may provide the data, read from the memory device 150, with the host 102. The controller 130 may store the data, provided by the host 102, into the memory device 150.

The controller 130 may include a host interface (I/F) 132, a processor 134, an error correction code (ECC) component 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols such as a universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface 132 is a component for exchanging data with the host 102, which may be implemented through firmware called a host interface layer (HIL).

The ECC component 138 may correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added, and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data. When the number of the error bits is greater than or equal to a threshold number of correctable error bits, the ECC component 138 may not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and on the like. The ECC component 138 may include suitable circuits, modules, systems and/or devices for performing the error correction operation based on at least one of the above described codes.

The PMU 140 may provide and manage an electrical power in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented through a firmware called a Flash Interface Layer (FIL) as a component for exchanging data with the memory device 150.

The memory 144 may support operations performed by the memory system 110 and the controller 130. The memory 144 may store temporary or transactional data occurred or delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data required for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 1 shows the memory 144 disposed within the controller 130, the invention is not limited thereto. That is, the memory 144 may be located within or externally to the controller 130. For instance, the memory 144 may be embodied by an external volatile memory having a memory interface transferring data and/or signals between the memory 144 and the controller 130.

The memory 144 can store data necessary for performing operations such as data writing and data reading requested by the host 102 and/or data transfer between the memory device 150 and the controller 130 for background operations such as garbage collection or wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134, which may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may load, generate, update, or store map data. Therefore, the controller 130 may map a logical address, which is entered from the host 102, with a physical address of the memory device 150 through the map data. The memory device 150 may function as a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programed page) due to a characteristic of a flash memory device. Further, the controller 130 may store map data of the new data into the FTL.

For example, when performing an operation requested from the host 102 in the memory device 150, the controller 130 uses the processor 134 implemented as a microprocessor or a central processing unit (CPU) or the like. The processor 134 engaged with the memory device 150 can process command operation corresponding to an inputted command from the host 102. The controller 130 can perform a foreground operation as a command operation, corresponding to an command inputted from the host 102, such as a program operation corresponding to a write command, a read operation corresponding to a read command, an erase/discard operation corresponding to an erase/discard command, and a parameter set operation corresponding to a set parameter command, a set feature command or a set command.

For another example, the controller 130 may perform a background operation on the memory device 150 through the processor 134. By way of example but not limitation, the background operation for the memory device 150 includes an operation (e.g., a garbage collection (GC) operation) for copying data stored in one memory block among the memory blocks 152, 154, 156 . . . in the memory device 150, and storing the copied data in another memory block. The background operation can include an operation (e.g., a wear leveling (WL) operation) to move or swap data between any two or more of the memory blocks 152, 154, 156 . . . in memory device 150. As the background operation, the controller 130 uses the processor 134 for storing the map data stored in the controller 130 to at least one of the memory blocks 152, 154, 156 . . . in the memory device 150, e.g., a map flush operation. A bad block management operation of checking for bad blocks among the plurality of memory blocks 152, 154, 156 . . . is another example of a background operation performed by the processor 134.

In the memory system 110, the controller 130 performs a plurality of command operations corresponding to a plurality of commands entered from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 can determine which channel(s) or way(s) among a plurality of channels (or ways) for connecting the controller 130 to a plurality of memory dies in the memory device 150 is/are proper or appropriate for performing each operation. The controller 130 can send or transmit data or instructions via determined channels or ways for performing each operation. The plurality of memory dies in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By way of example but not limitation, the controller 130 can recognize statuses regarding a plurality of channels (or ways) associated with a plurality of memory dies included in the memory device 150. The controller 130 may determine each channel or each way as one of a busy state, a ready state, an active state, an idle state, a normal state and/or an abnormal state. Controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is a data with a predetermined format or structure. For instance, the descriptors may include device descriptors, configuration descriptors, unit descriptors, and the like. The controller 130 can refer to, or use, the descriptors to determine which channel(s) or way(s) an instruction or a data is exchanged via.

A management unit (not shown) may be included in the processor 134. The management unit may perform bad block management of the memory device 150. The management unit may find bad memory blocks included in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 2:
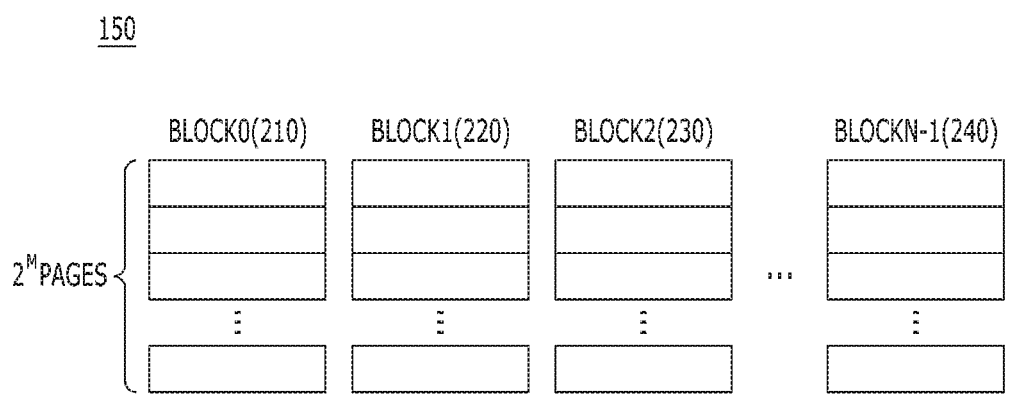
FIG. 2 is a diagram illustrating an example of a memory device included in a memory system in accordance with an embodiment of the disclosure.
Figure 3:
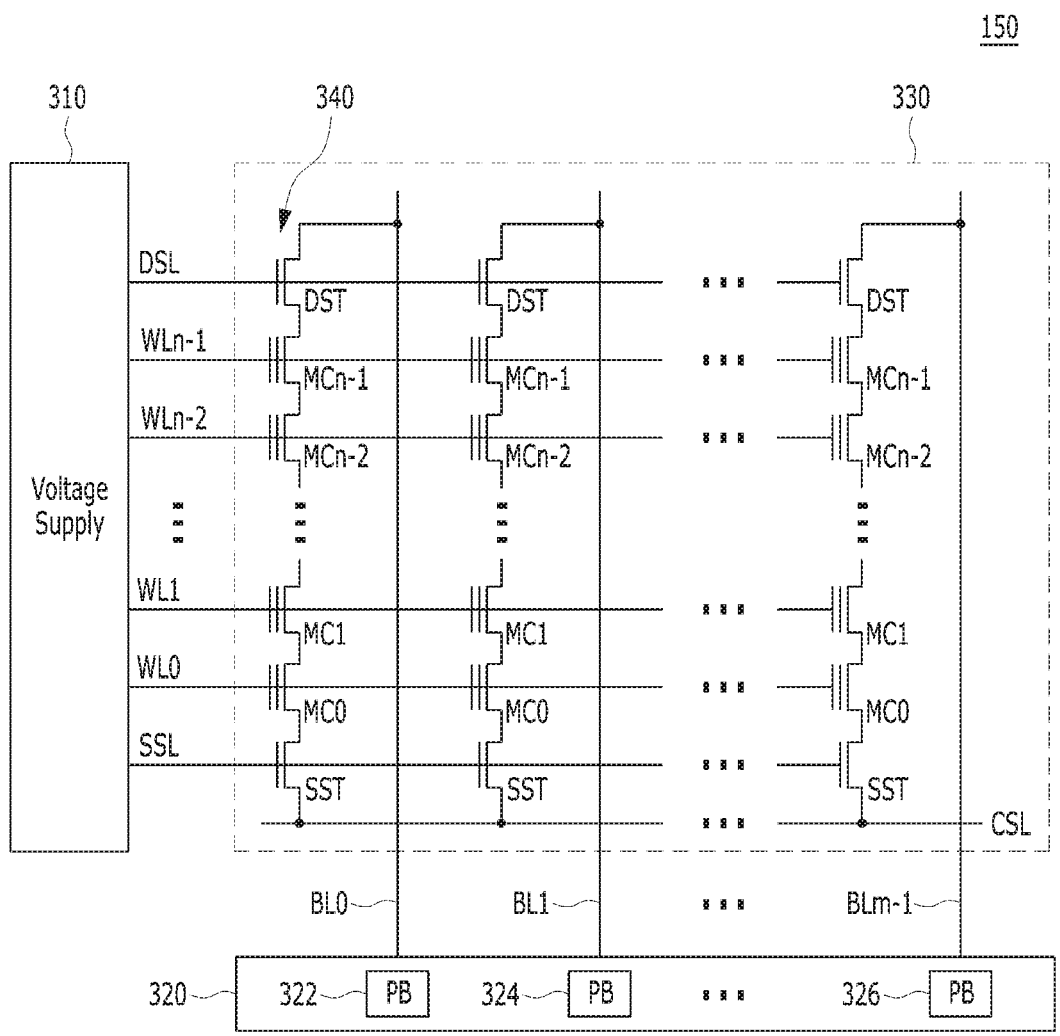
FIG. 3 is a diagram illustrating a non-volatile memory cell array in memory blocks included in a memory device in accordance with an embodiment of the disclosure.
Figure 4:
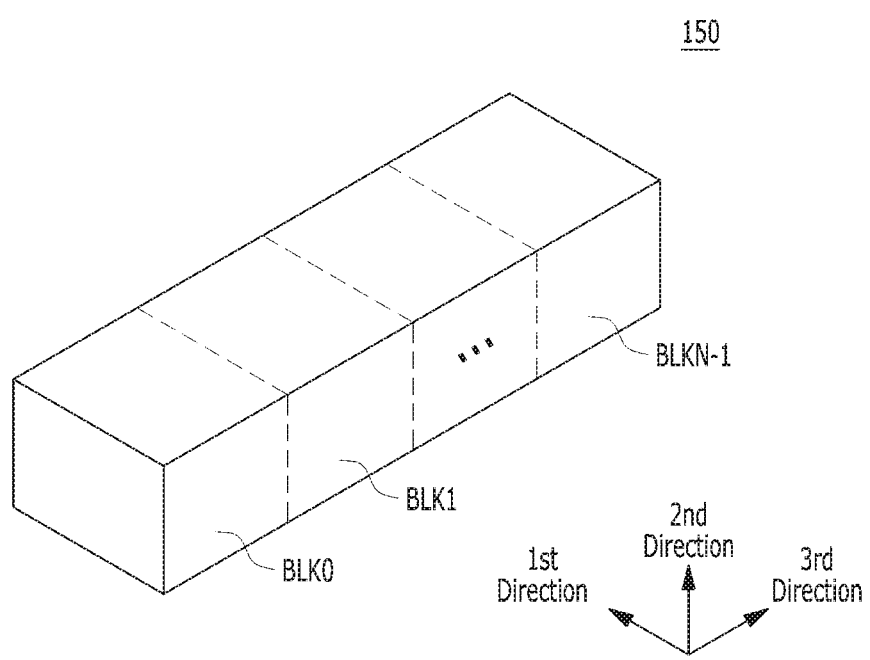
FIG. 4 is a diagram illustrating a memory device structure in a memory system in accordance with an embodiment of the disclosure.

FIG. 2 shows an example of a memory device included in a memory system in accordance with an embodiment of the invention, FIG. 3 shows a non-volatile memory cell array in memory blocks included in a memory device in accordance with an embodiment of the invention, and FIG. 4 shows an example of a 3-demensional memory device structure in a memory system in accordance with an embodiment of the invention.

Referring to FIG. 2, the memory device 150 can include a plurality of memory blocks, such as a first block (BLOCK0) 210, a second block (BLOCK1) 220, a third block (BLOCK2) 230 to a $n^{th}$ block (BLOCKN-1) 240. Each of blocks 210, 220, 230 to 240 can include a plurality of pages, e.g., $2^M$ pages, 2M Pages, or M pages. Here, n and M are natural numbers. For convenience of description, each of the memory blocks includes $2^M$ pages. Each of the pages can include a plurality of non-volatile memory cells coupled via a word line (WL) with each other.

The memory device 150 can include a plurality of memory blocks. Each of the plurality of memory blocks is one of different types of memory blocks such as a single level cell (SLC) memory block, a multi-level cell (MLC) memory block or the like, according to the number of bits that can be stored or represented in one memory cell. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity than the SLC memory block. The MLC memory block can be highly integrated to provide larger storage capacity within the same amount of space as the SLC memory block. In an embodiment, the memory device 150 may be implemented with MLC memory blocks such as an MLC' memory block, a triple level cell (TLC) memory block, a quadruple level cell (QLC) memory block, and a combination thereof. The MLC' memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

In an embodiment of the disclosure, the memory device 150 is embodied as a nonvolatile memory such as a flash memory, e.g., a NAND flash memory, a NOR flash memory and the like. In other embodiments, the memory device 150 may be implemented by at least one of a phase change random access memory (PCRAM), a ferroelectrics random access memory (FRAM), a spin transfer torque random access memory (STT-RAM), and a spin transfer torque magnetic random access memory (STT-MRAM), or the like.

Each of the blocks 210, 220, 230 to 240 in the memory device 150 can store data provided from the host 102 through a program operation and provide the stored data to the host 102 through a read operation.

Referring to FIG. 3, a memory block 330 which may correspond to any of the plurality of memory blocks 152, 154, 156 . . . included in the memory device 150 of the memory system 110 may include a plurality of cell strings 340 coupled to a plurality of corresponding bit lines BL0 to BLm-1. The cell string 340 of each column may include one or more drain select transistors DST and one or more source select transistors SST. Between the drain and source select transistors DST, SST, a plurality of memory cells or memory cell transistors MC0 to MCn-1 may be coupled in series. In an embodiment, each of the memory cell transistors MC0 to MCn-1 may be embodied by an MLC capable of storing data information of a plurality of bits. Each of the cell strings 340 may be electrically coupled to a corresponding bit line among the plurality of bit lines BL0 to BLm-1. For example, as illustrated in FIG. 3, the first cell string is coupled to the first bit line BL0, and the last cell string is coupled to the last bit line BLm-1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage, and a pass voltage to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and may supply a current or a voltage onto bit lines according to the received data. The read/write circuit 320 may include a plurality of page buffers 322, 324 to 326 respectively corresponding to columns (or bit lines) or column pairs (or bit line pairs). Each of the page buffers 322, 324 to 326 may include a plurality of latches (not illustrated).

In addition, the memory device 150 may be implemented as a two-dimensional or three-dimensional memory device, and may be implemented as a non-volatile memory device of a three-dimensional solid stack structure. The memory device 150 may include a plurality of memory blocks BLK0 to BLKN-1. FIG. 4 is a block diagram for showing the memory blocks 152, 154, 156 . . . of the memory device 150 shown in FIG. 1. Each of the memory blocks 152, 154, 156 . . . can be implemented as a three-dimensional structure. For example, each of the memory blocks 152, 154, 156 . . . may be realized by a structure with dimensions extending in mutually orthogonal directions, e.g., an x-axis direction, a y-axis direction, and a z-axis direction.

By way of example but not limitation, each memory block 330 included in the memory device 150 may include a plurality of NAND strings (NSs) extending along a second direction, and/or can be provided with a plurality of NAND strings (NSs) along with a first direction or a third direction. Here, each NAND string NS is coupled with I/O control circuits via at least one of a bit line BL, at least one string select line SSL, at least one drain select line DSL, a plurality of word lines WL, at least one dummy word Line DWL, and a common source line CSL. The NAND string (NS) may include a plurality of transistors for switching on plural lines.

Each of the plurality of memory blocks 152, 154, 156 . . . in the memory device 150 can include a plurality of bit lines BL, a plurality of string select lines SSL, a plurality of drain select lines DSL, a plurality of word lines WL, a plurality of dummy word lines DWL and a plurality of common source lines CSL. Each memory block 330 includes a plurality of NAND strings (NSs) shown in FIG. 3.

Figure 5:
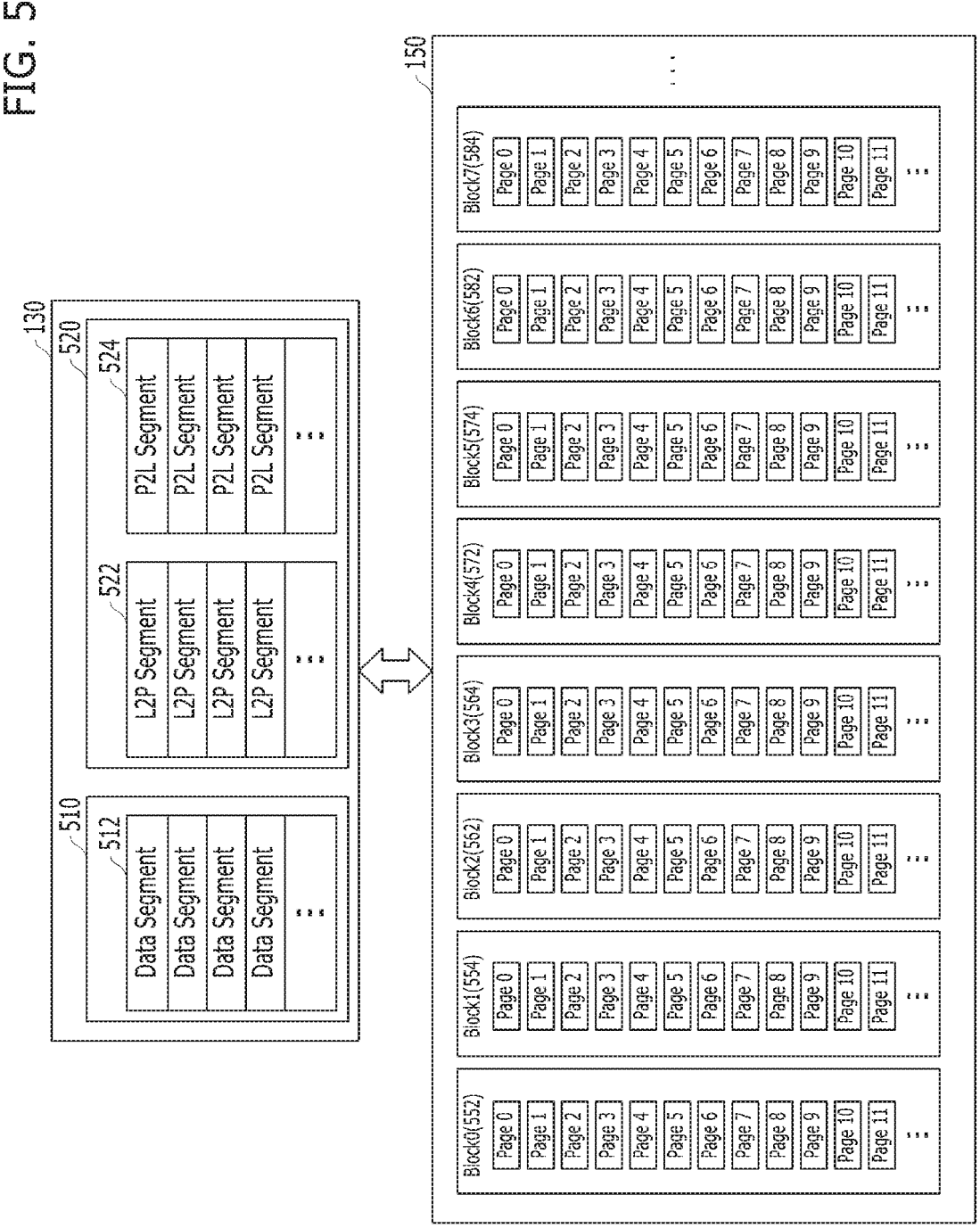
FIGS. 5 and 6 are diagrams illustrating examples in which a memory system in accordance with embodiments of the disclosure performs a plurality of command operations corresponding to a plurality of commands.
Figure 6:
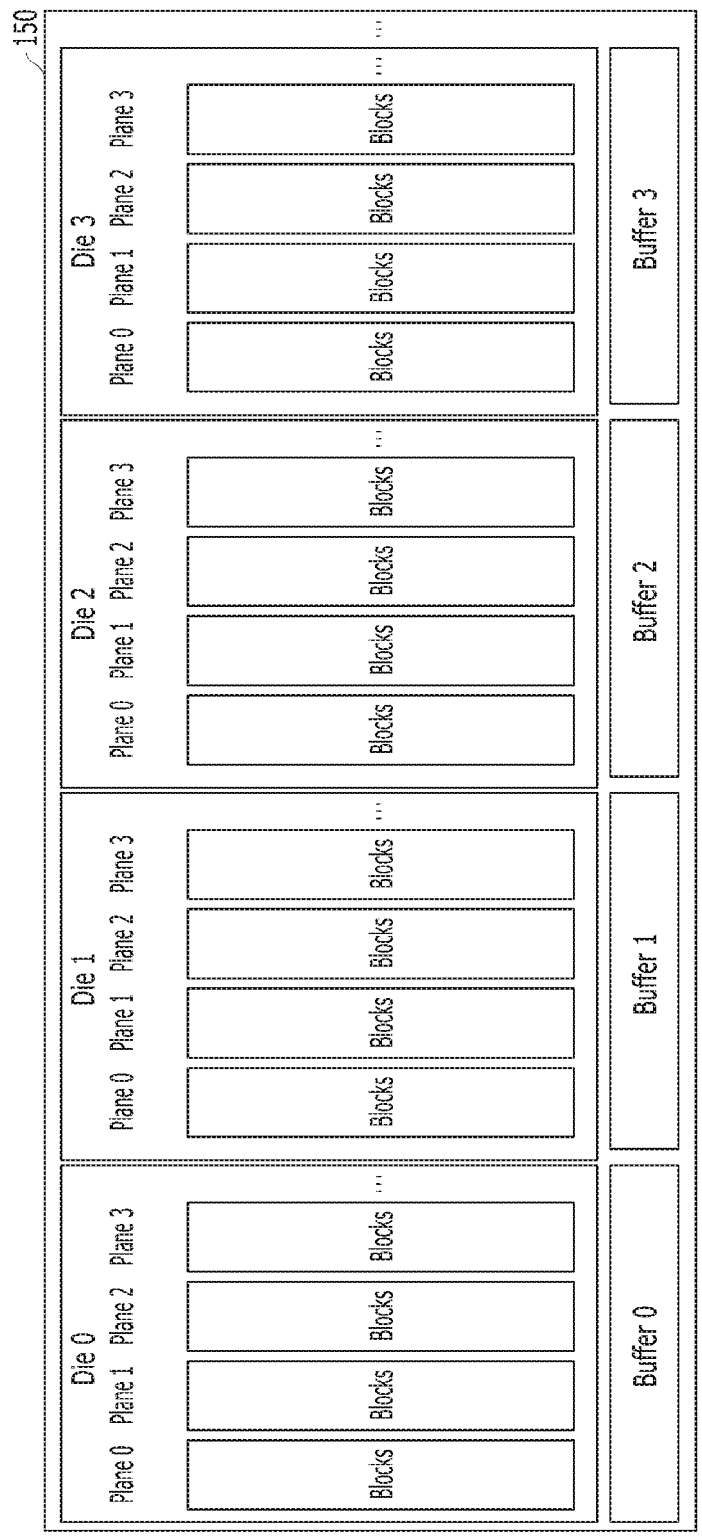

FIGS. 5 and 6 schematically illustrate an example of performing a plurality of command operations corresponding to a plurality of commands in the memory system in accordance with an embodiment of the disclosure. This is described in different contexts of a data processing operation, a first of which is a case where a plurality of write commands are received from the host 102 and program operations corresponding to the write commands are performed, a second of which is a case where a plurality of read commands are received from the host 102 and read operations corresponding to the read commands are performed, a third of which is a case where a plurality of erase commands are received from the host 102 and erase operations corresponding to the erase commands are performed, and a fourth of which is a case where a plurality of write commands and a plurality of read commands are received together from the host 102 and program operations and read operations corresponding to the write commands and the read commands are performed.

Moreover, in an embodiment of the disclosure, a case is described in which write data corresponding to a plurality of write commands entered from the host 102 are stored in the buffer/cache included in the memory 144 of the controller 130, the write data stored in the buffer/cache are programmed to and stored in the plurality of memory blocks included in the memory device 150, map data are updated which correspond to the stored write data in the plurality of memory blocks, and the updated map data are stored in the plurality of memory blocks included in the memory device 150. In other words, a case is described in which program operations corresponding to a plurality of write commands entered from the host 102 are performed. Furthermore, in still another embodiment of the disclosure, a case is described in which a plurality of read commands are entered from the host 102 for the data stored in the memory device 150, data corresponding to the read commands are read from the memory device 150 by checking the map data of the data corresponding to the read commands, the read data are stored in the buffer/cache included in the memory 144 of the controller 130, and the data stored in the buffer/cache are provided to the host 102. In other words, a case where read operations corresponding to a plurality of read commands entered from the host 102 are performed is described. In addition, in another embodiment of the disclosure, a case is described in which a plurality of erase commands are received from the host 102 for the memory blocks included in the memory device 150, memory blocks are checked corresponding to the erase commands, the data stored in the checked memory blocks are erased, map data are updated which correspond to the erased data, and the updated map data are stored in the plurality of memory blocks included in the memory device 150. Namely, a case where erase operations corresponding to a plurality of erase commands received from the host 102 are performed is described.

In connection with such description it is described as an example that the controller 130 performs command operations in the memory system 110. However, it is noted that, as described above, the processor 134 in the controller 130 may perform command operations in the memory system 110, through, for example, an FTL (flash translation layer). Also, the controller 130 programs and stores user data and metadata corresponding to write commands entered from the host 102, in arbitrary memory blocks among the plurality of memory blocks included in the memory device 150, reads user data and metadata corresponding to read commands received from the host 102, from arbitrary memory blocks among the plurality of memory blocks included in the memory device 150, and provides the read data to the host 102, or erases user data and metadata, corresponding to erase commands entered from the host 102, from arbitrary memory blocks among the plurality of memory blocks in the memory device 150.

Metadata may include first map data including a logical/physical (L2P: logical to physical) information (logical information) and second map data including a physical/logical (P2L: physical to logical) information (physical information), for data stored in memory blocks in correspondence to a program operation. Also, the metadata may include an information on command data corresponding to a command received from the host 102, an information on a command operation corresponding to the command, an information on the memory blocks of the memory device 150 for which the command operation is to be performed, and an information on map data corresponding to the command operation. In other words, metadata may include all remaining information and data excluding user data corresponding to a command received from the host 102.

That is, in an embodiment of the disclosure, in the case where the controller 130 receives a plurality of write commands from the host 102, program operations corresponding to the write commands are performed, and user data corresponding to the write commands are written and stored in empty memory blocks, open memory blocks or free memory blocks for which an erase operation has been performed, among the memory blocks of the memory device 150. Also, first map data, including an L2P map table or an L2P map list in which logical information as the mapping information between logical addresses and physical addresses for the user data stored in the memory blocks are recorded, and second map data, including a P2L map table or a P2L map list in which physical information as the mapping information between physical addresses and logical addresses for the memory blocks stored with the user data are recorded, are written and stored in empty memory blocks, open memory blocks or free memory blocks among the memory blocks of the memory device 150.

Here, in the case where write commands are entered from the host 102, the controller 130 writes and stores user data corresponding to the write commands in memory blocks. The controller 130 stores, in other memory blocks, metadata including first map data and second map data for the user data stored in the memory blocks. Particularly, in correspondence to that the data segments of the user data are stored in the memory blocks of the memory device 150, the controller 130 generates and updates the L2P segments of first map data and the P2L segments of second map data as the map segments of map data among the meta segments of metadata. The controller 130 stores the map segments in the memory blocks of the memory device 150. The map segments stored in the memory blocks of the memory device 150 are loaded in the memory 144 included in the controller 130 and are then updated.

Further, in the case where a plurality of read commands are received from the host 102, the controller 130 reads read data corresponding to the read commands, from the memory device 150, stores the read data in the buffers/caches included in the memory 144 of the controller 130. The controller 130 provides the data stored in the buffers/caches, to the host 102, by which read operations corresponding to the plurality of read commands are performed.

In addition, in the case where a plurality of erase commands are received from the host 102, the controller 130 checks memory blocks of the memory device 150 corresponding to the erase commands, and then, performs erase operations for the memory blocks.

When command operations corresponding to the plurality of commands received from the host 102 are performed while a background operation is performed, the controller 130 loads and stores data corresponding to the background operation, that is, metadata and user data, in the buffer/cache included in the memory 144 of the controller 130, and then stores the data, that is, the metadata and the user data, in the memory device 150. By way of example but not limitation, the background operation may include a garbage collection operation or a read reclaim operation as a copy operation, a wear leveling operation as a swap operation or a map flush operation, For instance, for the background operation, the controller 130 may check metadata and user data corresponding to the background operation, in the memory blocks of the memory device 150, load and store the metadata and user data stored in certain memory blocks of the memory device 150, in the buffer/cache included in the memory 144 of the controller 130, and then store the metadata and user data, in certain other memory blocks of the memory device 150.

In the memory system in accordance with an embodiment of the disclosure, in the case of performing command operations as foreground operations and a copy operation, a swap operation and a map flush operation as background operations, the controller 130 schedules queues corresponding to the foreground operations and the background operations and allocates the scheduled queues to the memory 144 included in the controller 130 and the memory included in the host 102. In this regard, the controller 130 assigns identifiers (IDs) by respective operations for the foreground operations and the background operations to be performed in the memory device 150, and schedules queues corresponding to the operations assigned with the identifiers, respectively. In the memory system in accordance with an embodiment of the disclosure, identifiers are assigned not only by respective operations for the memory device 150 but also by functions for the memory device 150, and queues corresponding to the functions assigned with respective identifiers are scheduled.

In the memory system in accordance with an embodiment of the disclosure, the controller 130 manages the queues scheduled by the identifiers of respective functions and operations to be performed in the memory device 150. The controller 130 manages the queues scheduled by the identifiers of a foreground operation and a background operation to be performed in the memory device 150. In the memory system in accordance with an embodiment of the disclosure, after memory regions corresponding to the queues scheduled by identifiers are allocated to the memory 144 included in the controller 130 and the memory included in the host 102, the controller 130 manages addresses for the allocated memory regions. The controller 130 performs not only the foreground operation and the background operation but also respective functions and operations in the memory device 150, by using the scheduled queues.

Referring to FIG. 5, the controller 130 performs command operations corresponding to a plurality of commands entered from the host 102, for example, program operations corresponding to a plurality of write commands entered from the host 102. The controller 130 programs and stores user data corresponding to the write commands, in memory blocks of the memory device 150. Also, in correspondence to the program operations with respect to the memory blocks, the controller 130 generates and updates metadata for the user data and stores the metadata in the memory blocks of the memory device 150.

The controller 130 generates and updates first map data and second map data which include information indicating that the user data are stored in pages included in the memory blocks of the memory device 150. That is, the controller 130 generates and updates L2P segments as the logical segments of the first map data and P2L segments as the physical segments of the second map data, and then stores them in pages included in the memory blocks of the memory device 150.

For example, the controller 130 caches and buffers the user data corresponding to the write commands entered from the host 102, in a first buffer 510 included in the memory 144 of the controller 130. Particularly, after storing data segments 512 of the user data in the first buffer 510 worked as a data buffer/cache, the controller 130 stores the data segments 512 stored in the first buffer 510 in pages included in the memory blocks of the memory device 150. As the data segments 512 of the user data corresponding to the write commands received from the host 102 are programmed to and stored in the pages included in the memory blocks of the memory device 150, the controller 130 generates and updates the first map data and the second map data. The controller 130 stores them in a second buffer 520 included in the memory 144 of the controller 130. Particularly, the controller 130 stores L2P segments 522 of the first map data and P2L segments 524 of the second map data for the user data, in the second buffer 520 as a map buffer/cache. As described above, the L2P segments 522 of the first map data and the P2L segments 524 of the second map data may be stored in the second buffer 520 of the memory 144 in the controller 130. A map list for the L2P segments 522 of the first map data and another map list for the P2L segments 524 of the second map data may be stored in the second buffer 520. The controller 130 stores the L2P segments 522 of the first map data and the P2L segments 524 of the second map data, which are stored in the second buffer 520, in pages included in the memory blocks of the memory device 150.

Also, the controller 130 performs command operations corresponding to a plurality of commands received from the host 102, for example, read operations corresponding to a plurality of read commands received from the host 102. Particularly, the controller 130 loads L2P segments 522 of first map data and P2L segments 524 of second map data as the map segments of user data corresponding to the read commands, in the second buffer 520, and checks the L2P segments 522 and the P2L segments 524. Then, the controller 130 reads the user data stored in pages of corresponding memory blocks among the memory blocks of the memory device 150, stores data segments 512 of the read user data in the first buffer 510, and then provides the data segments 512 to the host 102.

Furthermore, the controller 130 performs command operations corresponding to a plurality of commands entered from the host 102, for example, erase operations corresponding to a plurality of erase commands entered from the host 102. In particular, the controller 130 checks memory blocks corresponding to the erase commands among the memory blocks of the memory device 150 to carry out the erase operations for the checked memory blocks.

In the case of performing an operation of copying data or swapping data among the memory blocks included in the memory device 150, for example, a garbage collection operation, a read reclaim operation or a wear leveling operation, as a background operation, the controller 130 stores data segments 512 of corresponding user data, in the first buffer 510, loads map segments 522, 524 of map data corresponding to the user data, in the second buffer 520, and then performs the garbage collection operation, the read reclaim operation or the wear leveling operation. In the case of performing a map update operation and a map flush operation for metadata, e.g., map data, for the memory blocks of the memory device 150 as a background operation, the controller 130 loads the corresponding map segments 522, 524 in the second buffer 520, and then performs the map update operation and the map flush operation.

As aforementioned, in the case of performing functions and operations including a foreground operation and a background operation for the memory device 150, the controller 130 assigns identifiers by the functions and operations to be performed for the memory device 150. The controller 130 schedules queues respectively corresponding to the functions and operations assigned with the identifiers, respectively. The controller 130 allocates memory regions corresponding to the respective queues, to the memory 144 included in the controller 130 and the memory included in the host 102. The controller 130 manages the identifiers assigned to the respective functions and operations, the queues scheduled for the respective identifiers and the memory regions allocated to the memory 144 of the controller 130 and the memory of the host 102 in correspondence to the queues, respectively. The controller 130 performs the functions and operations for the memory device 150, through the memory regions allocated to the memory 144 of the controller 130 and the memory of the host 102.

Referring to FIG. 6, the memory device 150 includes a plurality of memory dies, for example, a memory die 0, a memory die 1, a memory die 2 and a memory die 3, and each of the memory dies includes a plurality of planes, for example, a plane 0, a plane 1, a plane 2 and a plane 3. The respective planes in the memory dies included in the memory device 150 include a plurality of memory blocks, for example, N number of blocks Block0, Block1, . . . , BlockN-1 each including a plurality of pages, for example, $2^M$ number of pages, as described above with reference to FIG. 3. Moreover, the memory device 150 includes a plurality of buffers corresponding to the respective memory dies, for example, a buffer 0 corresponding to the memory die 0, a buffer 1 corresponding to the memory die 1, a buffer 2 corresponding to the memory die 2 and a buffer 3 corresponding to the memory die 3.

In the case of performing command operations corresponding to a plurality of commands received from the host 102, data corresponding to the command operations are stored in the buffers included in the memory device 150. For example, in the case of performing program operations, data corresponding to the program operations are stored in the buffers, and are then stored in the pages included in the memory blocks of the memory dies. In the case of performing read operations, data corresponding to the read operations are read from the pages included in the memory blocks of the memory dies, are stored in the buffers, and are then provided to the host 102 through the controller 130.

In an embodiment of the disclosure, while it will be described below as an example that the buffers in the memory device 150 exist outside the respective corresponding memory dies, it is to be noted that the buffers may exist inside the respective corresponding memory dies, and it is to be noted that the buffers may correspond to the respective planes or the respective memory blocks in the respective memory dies. Further, while it will be described below as an example that the buffers in the memory device 150 are the plurality of page buffers 322, 324 to 326 as described above with reference to FIG. 3, it is to be noted that the buffers may be a plurality of caches or a plurality of registers included in the memory device 150.

Also, the plurality of memory blocks included in the memory device 150 may be grouped into a plurality of super memory blocks, and command operations may be performed in the plurality of super memory blocks. Each of the super memory blocks may include a plurality of memory blocks, for example, memory blocks included in a first memory block group and a second memory block group. In this regard, in the case where the first memory block group is included in the first plane of a certain first memory die, the second memory block group may be included in the first plane of the first memory die, be included in the second plane of the first memory die or be included in the planes of a second memory die.

In an embodiment of the disclosure, a data processing system may include plural memory systems. Each of the plural memory systems 110 can include the controller 130 and the memory device 150. In the data processing system, one of the plural memory systems 110 can be a master and the others can be a slave. The master may be determined based on contention between the plural memory systems 110. When a plurality of commands is delivered from the host 102 in the data processing system, the master can determine a destination of each command based at least on statuses of channels or buses. For example, a first memory system can be determined as a master memory system among a plurality of memory systems, corresponding to information delivered from the plurality of memory systems. If the first memory system is determined as the master memory system, the remaining memory systems are considered slave memory systems. A controller of the master memory system can check statuses of a plurality of channels (or ways, buses) coupled to a plurality of memory systems, to select which memory system handles commands or data delivered from the host 102. In an embodiment, a master can be dynamically determined among the plural memory systems. In another embodiment, a master memory system may be changed with one of other slave memory systems periodically or according to an event.

A method and apparatus for transferring data in the memory system 110 including the memory device 150 and the controller 130 is described below in more detail. As the amount of data stored in the memory system 110 becomes larger, the memory system 110 may be required to read or store large amounts of data at a time. However, a read time for reading a data stored in the memory device 150 or a program/write time for writing a data in the memory device 150 may be generally longer than a processing time for the controller 130 to process a data or a data transmission time for data transfer between the controller 130 and the memory system 150. For example, the read time might be twice the processing time. Since the read time or the program time is relatively far longer than the processing time or the data transmission time, a procedure or a process for delivering data in the memory system 110 may affect performance of the memory system 110, e.g., an operation speed, and/or structure of the memory system 110 such as a buffer size.

Figure 7:
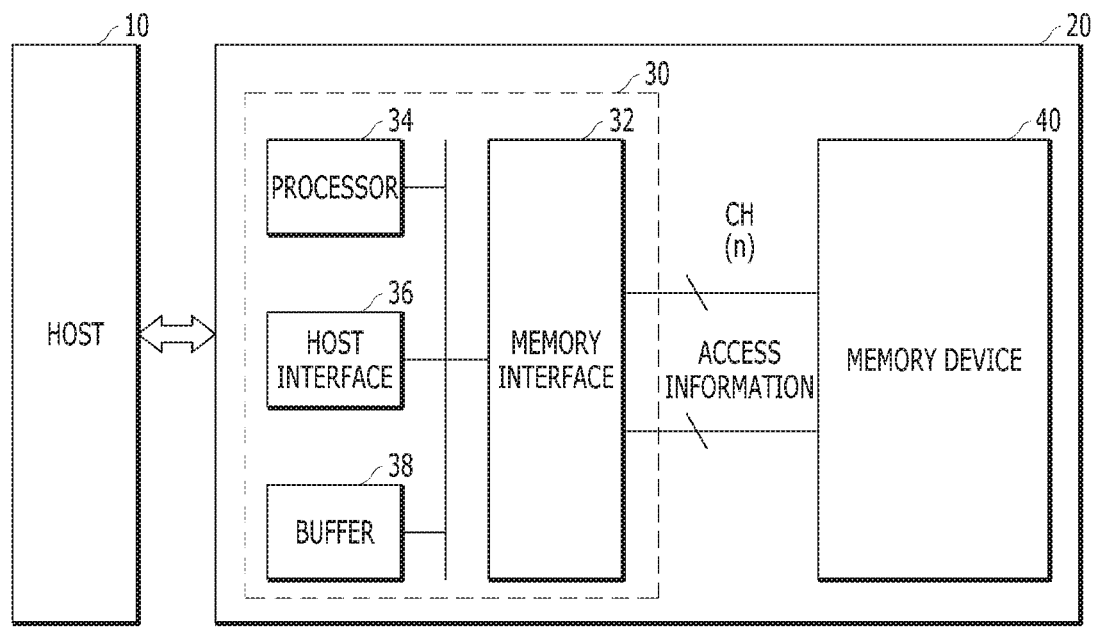
FIG. 7 is a block diagram illustrating an example of a memory system in accordance with an embodiment of the disclosure.

In FIG. 7, a memory system 20 is described. The memory system 20 is an example of a memory system in accordance with another embodiment of the disclosure. By way of example but not limitation, the memory system 20 can be embedded within a computing device or a mobile device. The memory system 20 can be engaged with a host 10 for transmitting or receiving data.

Referring to FIG. 7, the memory system 20 can include a controller 30 and a memory device 40. The controller 30 outputs data from the memory device 40, which is requested by the host 10. Or, the controller 30 stores data delivered from the host 10 to the memory device 40. The memory device 40 can include plural memory cells storing data. An internal structure of the memory device 40 may be designed or configured according to characteristics of the memory device 40, purposes for which the memory system 20 is used, and/or specifications of the memory system 20, which are required by the host 10. For example, the memory device 40 and the memory device 150 illustrated in FIGSs. 2 to 6 may have substantially the same structure.

The controller 30 and the memory device 40 can exchange data with each other through 'n' number of channels, where 'n' is an integer larger than one. However, in order for the controller 30 to read or write data to the memory device 40, additional control variables or control signals may be required depending on the internal structure of the memory device 40.

The controller 30 may include at least one processor 34, a host interface 36, a buffer 38, and a memory interface 32. The processor 34 is for command operations within the controller 30 and may perform a role like that of a CPU used in a computing device. The host interface 36 is for data communication between the memory system 20 and the host 10, while the memory interface 32 is for data communication between the memory device 40 and the controller 30. The buffer 38 can temporarily store required data and operation status during the operation of the processor 34, the host interface 36 and the memory interface 32, and/or I/O data delivered between the memory device 40 and the host 10. The elements of the controller 30 described above may be functional ones according to an operation, a task, or the like that is processed by the controller.

In a physical view, the controller 30 may include at least one processor, at least one memory, at least one input/output port, a wire for electrical connection between the components and the like.

As the number of memory cells capable of storing data in the memory device 40 increases, the internal structure of the memory device 40 can be complicated as described in FIG. 6. The controller 30 may transmit or receive the data along with access information according to the internal configuration of the memory device 40. Here, the access information may include information regarding the 'n' number of channels, the 'k' number of ways, 'p' bits of multi-level data stored in each memory cell, the 'b' number of planes included in a predetermined logical storage unit, and the like. That is, when the controller 30 programs data to the memory device 40 or reads data from the memory device 40, the controller 30 can use the information regarding the 'n' number of channels, the 'k' number of ways, the 'p' bits of multi-level data stored in each memory cell and/or the 'b' number of planes. The information can be used to indicate or determine locations where data is stored into, e.g., plural memory cells each specified by at least one of the 'n' number of channels, at least one of the 'k' number of ways, at least one of the 'p' bits of multi-level data and/or at least one of the 'b' number of planes in the predetermined logical storage unit.

Figure 8:
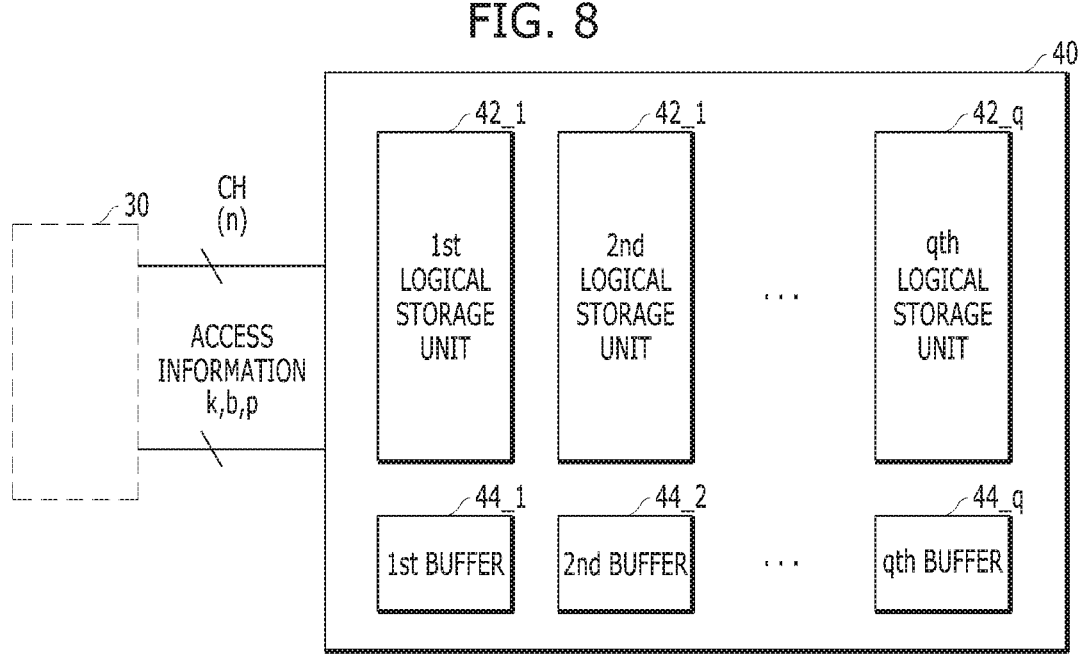
FIG. 8 is a block diagram illustrating an example of a memory device in accordance with an embodiment of the disclosure.

In FIG. 8, an example of a memory device in accordance with another embodiment of the disclosure is described.

Referring to FIG. 8, the memory device 40 engaged with the controller 30 may include a plurality of logical storage units 42_1, 42_2, . . . , 42_q (42_1 to 42_q) and a plurality of buffers 44_1 to 44_q. Here, each of the logical storage units 42_1, 42_2, . . . , 42_q (42_1 to 42_q) can be associated with at least one plane. The logical storage unit may correspond to a group of memory cells which are arranged or accessed for data during operations of writing or reading the data to or from the memory device 40.

The memory device 40 can include a plurality of memory dies, each including a plurality of planes, each including a plurality of memory blocks, such as the memory device 150 described in FIGS. 1 to 4. The logical storage unit described in FIG. 8 can be considered an operational unit for reading and writing data to and from the memory device 40. In an embodiment, the logical storage unit is associated with at least one plane when the memory device 40 includes a plurality of planes. For example, the logical storage unit can lie over plural planes, and some of each plane can be included in the logical storage unit. In another embodiment, the logical storage unit in the memory device 40 may be determined on a basis of die-by-die, block-by-block, page-by-page, or the like. Further, the logical storage unit may be determined differently depending on the controller 30 or a size of buffer included in the memory system 20 (see FIG. 7), the number of channels, a power management apparatus, and the like.

Although not shown, a plurality of planes included in one logical storage unit 42_1 to 42_q may be part of a die, each of which can be separated by a channel and a way. For example, it is assumed that there are ten die in the memory device 40. Five planes of each die can be grouped together and arranged as a single logical storage unit. The number of dies included in memory device 40 and the number of planes included in each die may vary in accordance with an embodiment. Thus, there may be a variety of ways to select some of the plural dies included in the memory device 40 and select some of the plural planes included in the selected die for establishing a logical storage unit. In particular, the logical storage unit may be used as a basic unit for read and write operations in the memory system 20. When memory cells included in the memory system 20 may have a predetermined lifetime for read and write operations, the logical storage unit may be changed or adjusted periodically or conditionally (e.g., according to predetermined conditions) in order to increase the overall lifetime of the memory cells.

Each of the logical storage units 42_1 to 42_q can be engaged with each of the buffers 44_1 to 44_q. At least one buffer may be allocated for each logical storage unit in the memory device 40. The time (e.g., a read time, a program time, etc.) required to read data from or write data to the memory cells in each of the logical storage units 42_1 to 42_q may be longer than a data transmission time between the controller 30 and the memory device 40. Since a data transfer speed via a channel, which is considered a path through which the data moves between the memory device 40 and the controller 30, is faster than a read speed and a program speed of the memory device 40, a buffer can be arranged for each logical storage unit which enhances efficiency of data transmission via the channel.

In another embodiment, a plurality of buffers 44_1 to 44_q included in the memory device 40 do not correspond one-to-one to the plural logical storage units. But, the plurality of buffers 44_1 to 44_q can be provided to correspond to the number of dies or planes. The number and the size of the buffers may be changed depending on how the read operation or the program (write) operation is performed in the memory device 40.

In accordance with an embodiment, data transmission between the controller 30 and the memory device 40 may be achieved by a serial data communication method. For example, the controller 30 can be a master, and various modules in the memory device 40 can play a role as slaves. The format of the data transmitted through the channel may be packetized and may include a start area, a data area, an error check area, an end area, and the like.

In accordance with an embodiment, information about which logical storage unit data may be stored in the memory device 40 or which logical storage unit the data may be read or accessed from may be transmitted as a separate signal from the data or as a combined signal with the data. Further, a single logical storage unit may include a plurality of planes, and the plurality of planes may be coupled with the controller 30 through a plurality of channels or a plurality of ways. In addition, a memory cell included in the plurality of planes may be a multi-level cell (MLC) capable of storing data of 2 bit or more bits per cell.

For example, in order to accurately determine in which position of the memory device 40 data transferred from the controller 30 is to be stored during a program or write operation, the controller 30 can send information regarding one of the 'n' number of channels, one of the 'k' number of ways, one of 'p' bits in a multi-level data stored in the memory cell, and one of the 'b' number of planes included in the predetermined logical storage unit. In addition, in order to accurately read data from the memory device 40, the controller 30 can send information regarding one of the 'n' number of channels, one of the 'k' number of ways, one of 'p' bits in a multi-level data stored in the memory cell, and one of the 'b' number of planes. The memory device 40 can output the data based on the information.

In accordance with an embodiment, when a manner or a way of how the memory device 40 and the controller 30 transmit data to each other is determined, information indicating which one logical storage unit the data is stored in may be sufficient to perform a read operation or a program operation. Information regarding a specific channel, a specific way, a specific plane or a specific bit of memory cell might not be necessary. However, in this case, since the logical storage unit does not represent a physical storage location, the access information used under a physical transmission layer should include predetermined information which relates to the specific location where data is actually accessed and stored.

Figure 9A:
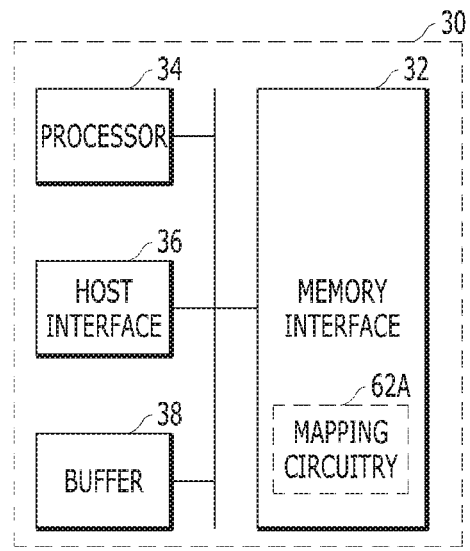
FIGS. 9A and 9B are block diagrams illustrating a mapping circuitry in accordance with an embodiment of the disclosure.
Figure 9B:
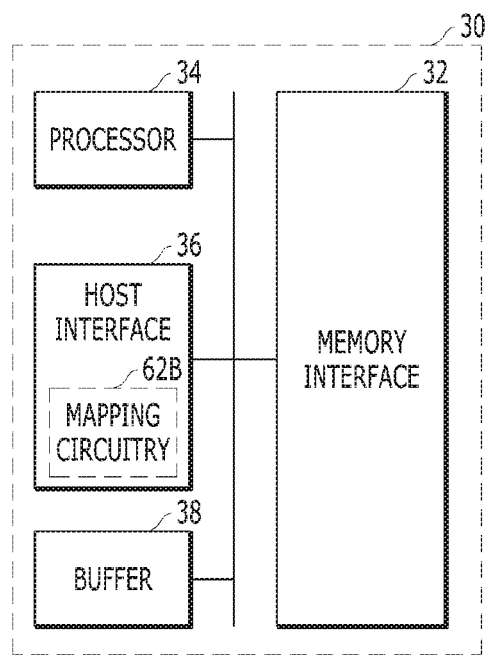

In FIGS. 9A and 9B, mapping circuitries 62A, 62B in accordance with various embodiments of the disclosure are described. Herein, the mapping circuitries 62A, 62B may determine which location or position of the memory device 40 the data delivered from the controller 30 can be stored in.

Referring to FIGS. 9A and 9B, the mapping circuitry 62A may be included in the memory interface 32 included in the controller 30, or the mapping circuitry 62B may be included in the host interface 36, in accordance with embodiments. The positions of the mapping circuitries 62A, 62B may be changed in accordance with an embodiment. The mapping circuitries 62A, 62B may operate in conjunction with the controller 30. The mapping circuitries 62A, 62B can determine where data is delivered in the memory device 40, based on at least one of a first order of the plurality of channels, a second order of the plurality of planes, a third order of the plurality of ways, and a fourth order of the plurality of bits of multi-level data stored in the memory cell.

In accordance with an embodiment, the internal structure or configuration of the controller 30 may be constituted with at least one circuitry corresponding to each element. As used in this application, the term 'circuitry' refers to all of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, an integrated circuit or an applications processor integrated circuit for a controller, a computing device, a gaming device, a mobile phone, a display, or a network or communication device. In accordance with another embodiment, the internal structure or configuration of the controller 30 may include elements based on functional classification according to an operation, a task, and the like which is processed by the controller 30.

The mapping circuitries 62A, 62B shown in FIGS. 9A and 9B can determine a transmission order indicating in which a large amount of data can be stored by various methods. FIGS. 10 to 14 illustrate how the mapping circuitries 62A and 62B transfer data to the memory device 40. In FIGS. 10 to 14, it is assumed that a single logical storage unit includes four planes P0, P1, P2, P3. The four planes P0, P1, P2, P3 are grouped from each of eight dies coupled via four channels 0 to 3 and two ways (Ways 0 to 1). FIGS. 10 to 14 shows examples of the memory device 40 including memory cells each capable of storing 3 bits of data per cell (e.g., a triple level cell (TLC)).

In FIGS. 10 to 14, first to fifth methods for data transmission from a controller to a memory device in accordance with embodiments are described. In a data transmission method described with reference to FIGS. 10 to 14, the triple level cell (TLC) include first to third bits of data, e.g., a most-significant bit, a center-significant bit and a least-significant bit (MSB, CSB, LSB). The data may be stored in the order of the third bit, the second bit, and the first bit. In accordance with an embodiment, it is also possible to store data in the order of the first bit, the second bit and the third bit in each memory cell.

Figure 10:
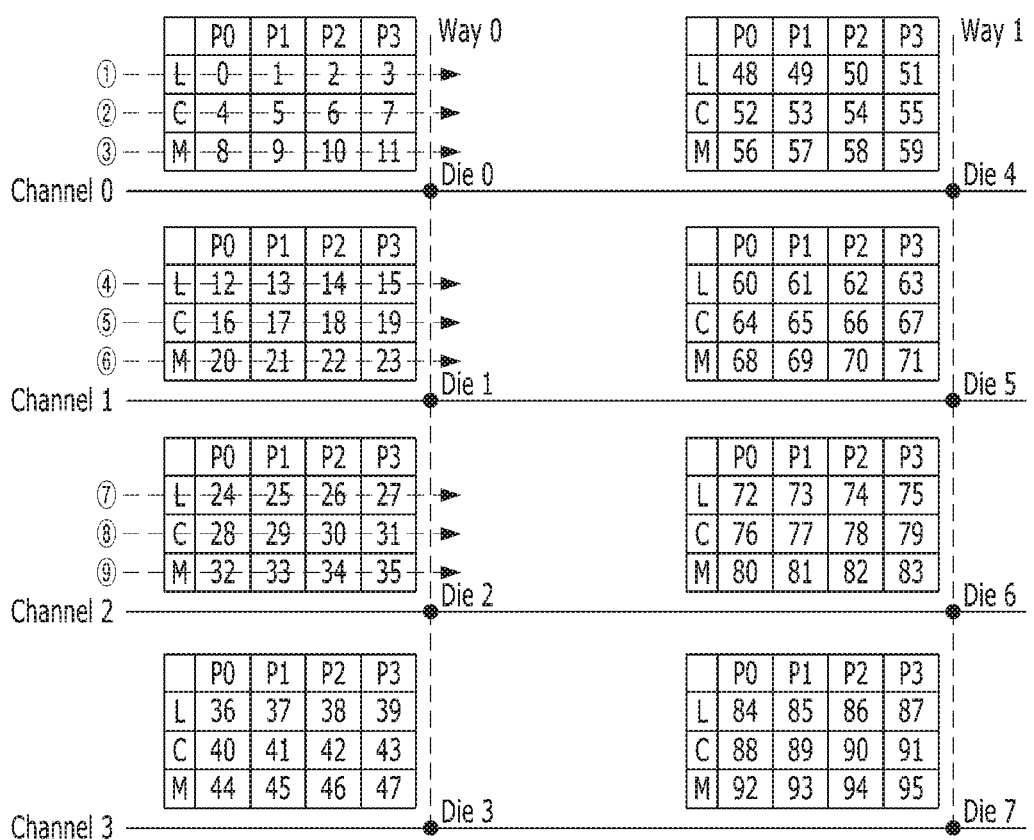
FIGS. 10 to 14 are diagrams illustrating first to fifth methods for data transmission from a controller to a memory device in accordance with embodiments of the disclosure.

FIG. 10 illustrates a first method of transferring data from the controller 30 to the memory device 40.

Referring to FIG. 10, the first method can transmit data to a first die Die 0 coupled via a first channel Channel 0 and a first way Way 0 first. After the data is filled into an available area in the plurality of planes P0, P1, P2, P3 included in the first die Die 0, the following data can be filled into an available area in the second die Die 1. After the data is assigned to plural dies Dies 0 to 3 coupled via the channels Channels 0 to 3 and the first way Way 0, the following data is assigned to the other dies Dies 4 to 7 coupled via the channels Channels 0 to 3 and a second way Way 1.

In each of the dies Die 0 to 7, data are assigned based on the order of the planes (P0→P1→P2→P3) and the order of bits (the third bit (LSB, L), the second bit (CSB, C), the first bit (MSB, M), i.e., L→C→M). First, in the first die Die 0, data is transferred in the order of the planes (P0→P1→P2→P3) corresponding to the third bit (L) of each memory cell (referring to the symbol '①'). Thereafter, the following data may be transmitted in the order of the planes (P0→P1→P2→P3) corresponding to the second bit (C) of each memory cell (referring to the symbol '②'). Then, the following data may be transmitted in the order of the planes (P0→P1→P2→P3) corresponding to the first bit (M) of each memory cell (referring to the symbol '③').

When data is transferred to all available space of the first die Die 0, the channel can be changed from the first channel Channel 0 to the second channel Channel 1 to transfer the following data into the second die Die 1. In the second die Die 1, in accordance with the order of the planes (P0→P1→P2→P3) and the order of bits (L→C→M), the following data can be transmitted (referring to the symbols '④,' '⑤,' '⑥').

When the data is assigned into all available spaces of the second die Die 1, the channel can be changed from the second channel Channel 1 to a third channel Channel 2 to transfer the following data into the third die Die 2. Like the first and second dies Dies 0 and 1, the following data can be transmitted based on the order of the planes (P0→P1→P2→P3) and the order of bits (L→C→M), referring to the symbols '⑦,' '⑧,' '⑨' in FIG. 10.

After data is transferred to all available spaces of the fourth die Die 3 in the same manner, the way can be changed from the first way Way 0 to the second way Way 1. Then, the following data is transmitted into the fifth die Die 4 coupled with the controller 30 via the first channel Channel 0 and the second way Way 1.

The first method described above is advantageous in that a size of the buffer 38 included in the controller 30 does not need to be large. Although there is a plurality of channels between the controller 30 and the memory device 40, the first method can transmit data having a predetermined size through a single channel, and then transmit the same size data via the next channel. Thus, the buffer 38 may have a small size corresponding to the maximum size of data transmitted over a single channel once. Also, in the first method, even if data has a size that cannot be transferred to all the dies Die 0 to 7, a dummy data might be not large because the write operation can be performed when the dummy data is transmitted only into the last die in which the data is not filled completely. This is another advantage, that the amount of dummy data is small.

However, since only a single channel among the plurality of channels is used, at least one channel other than the channel being used becomes in an idle state so that it may be inefficient in views of data transmission via the plurality of channels. Inefficiency in data transmission might result in a lower data input/output throughput of the memory system when voluminous data (a large amount of data) are read or programmed.

Figure 11:
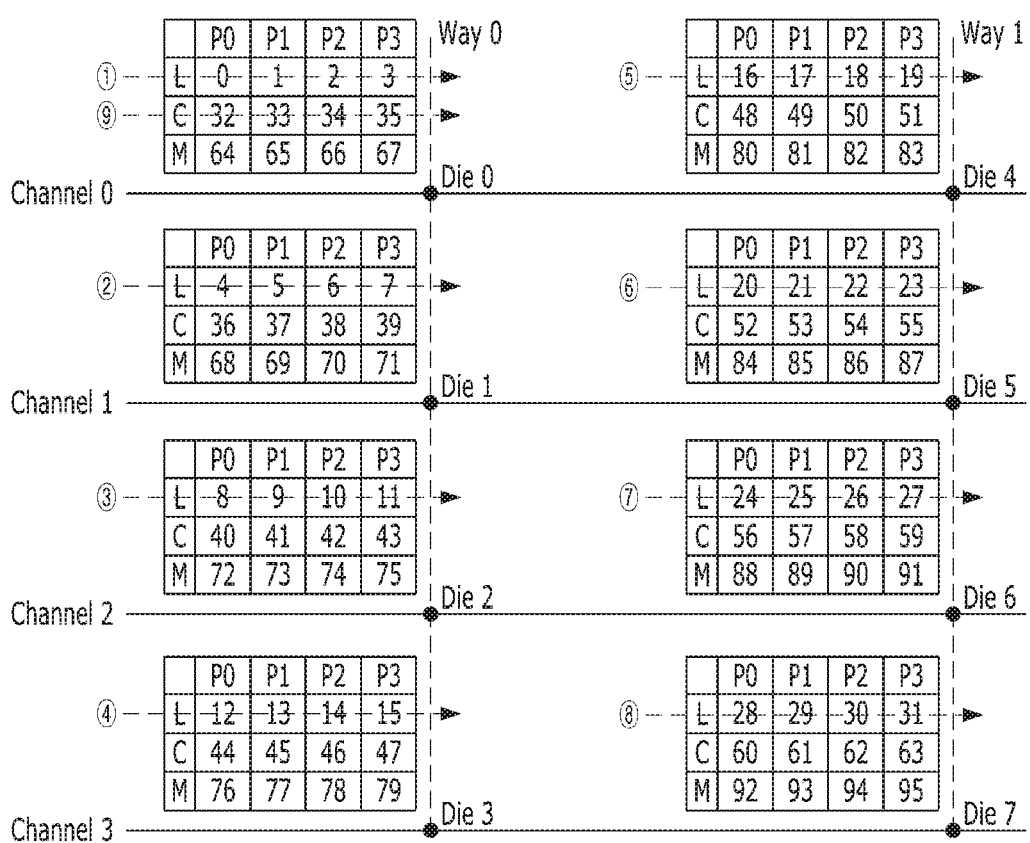

FIG. 11 illustrates a second method of transferring data from the controller 30 to the memory device 40.

Referring to FIG. 11, a second method is to transmit data of a single bit (LSB, L) to the plurality of planes P0, P1, P2, P3 included in the first die Die 0 coupled to the controller 30 via the first channel Channel 0 and the first way Way 0. After transmitting data assigned at the third bit (L) of memory cells in the plurality of planes P0, P1, P2, P3 included in the first die Die 0, the controller 30 can transmit the following data into the second die Die 1 connected to the next channel Channel 1. After transmitting data assigned at one bit of data into the dies (Dies 0-3) coupled via all channels (Channels 0-3) and the first way Way 0, the following data is transmitted into the other dies Dies 4 to 7 coupled via the second way Way 1. After data assigned as a single bit in all of memory cells in the logical storage unit are transmitted, the following data can be filled in the next bit (CSB, C) on a plurality of planes included in the first die Die 0 connected through the first channel Channel 0 and the first way Way 0.

In each die Die 0 to 7, one bit of data is transferred to each unit cell according to the order of the planes (P0→P1→P2→P3). First, when data corresponding to the third bit (LSB, L) is transferred to the plurality of planes P0, P1, P2, P3 included in each die according to the order of the dies Die 0 to 7 referring to the symbols (①→②→③→④→⑤→⑥→⑦→⑧), the following data assigned for the second bit (CSB, C) can start to be transmitted referring to the symbol ⑨. Thereafter, when data assigned for the second bit C are transmitted to all the dies Die 0 to 7, data corresponding to the third bit (MSB, M) can be transmitted. The order of the dies Die 0 to 7 can be determined based at least on the order of the channels (Channel 0→Channel 1→Channel 2→Channel 3) and the order of ways (Way 0→Way 1).

The second method described above can increase a size of the buffer 38 included in the controller 30 in proportion to the number of channels (e.g., four). Herein, the buffer 38 might have a data structure of a queue. Since data can be transmitted to all dies based on the order of the channels and the order of ways once, there is an advantageous effect of using a plurality of channels as compared with the first method described above in which data is transmitted for each die once by using the order of the channels and the order of the ways so that the second method can be faster than the first method for data transmission of voluminous data. However, since the channel transmits one bit of data to the plane included in a specific die, and then moves to the next channel to transmit the following data, no inter-channel overlap can occur. That is, since data is transmitted through a plurality of channels as compared with the first method, it is possible to reduce the time required for transferring the voluminous data from the controller 30 to the memory device 40. However, it might not be an optimal manner because the second method use the plurality of channels sequentially, not in parallel.

Figure 12:
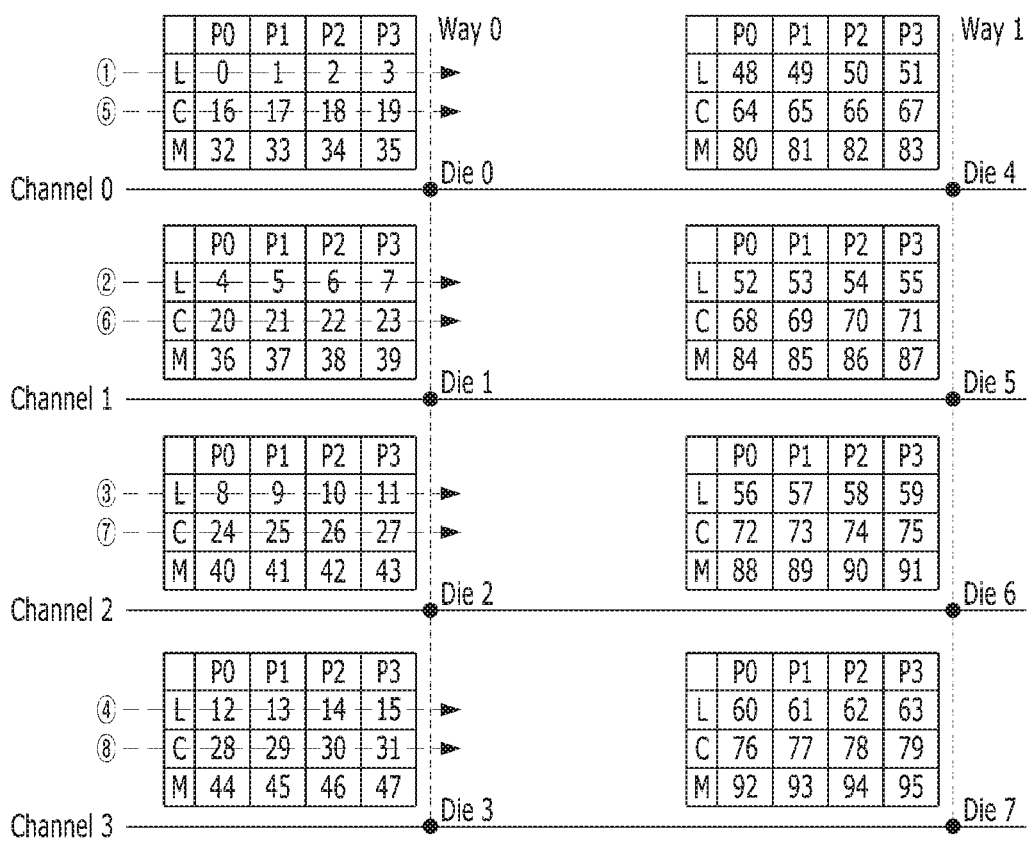

FIG. 12 illustrates a third method of transferring data from the controller 30 to the memory device 40.

Referring to FIG. 12, the third method can be distinguishable from the second method described in FIG. 11. In the second method, after data corresponding to a single bit are transmitted to all dies Die 0 to 7, the following data corresponding to the next bit are transmitted. However, in the third method, the data are transmitted into some dies (for example, Dies 0 to 3) of all dies Die 0 to 7 using a plurality of channels without changing the way. After the data are filled within some dies, the following data can be transmitted into the remaining die (e.g., Dies 4 to 7) by changing the way.

Specifically, in each of the dies Die 0 to 7, data can be stored according to the order of the planes (P0→P1→P2→P3) and the order of bits (L→C→M, i.e., the order of the third bit LSB (L), the second bit CSB (C), and the first bit MSB (M)). The data is transmitted through the first channel Channel 0 in the order of planes (P0→P1→P2→P3) and stored as the third bit L of memory cells included in the first die Die 0, referring to the symbol (①). Then, referring to the symbol (②), the following data can be transmitted through the second channel Channel 1 in the order of planes (P0→P1→P2→P3) and stored as the third bit L of memory cells included in the second die Die 1. Then, data may be transmitted into the third die Die 2. Referring to the symbol (③), data assigned to available spaces corresponding to the third bit (L) in the order of planes (P0→P1→P2→P3) may be delivered via the third channel Channel 2. The following data can be delivered via the fourth channel Channel 3 into the fourth die Die 3, which are assigned to available spaces corresponding to the third bit (L) in the order of planes (P0→P1→P2→P3), referring to the symbol (④).

In the second method shown in FIG. 11, the following data may be delivered into the fifth die Die 4 by changing the order of ways. However, in the third method, without changing the way, the following data may be delivered into the first die Die 0 via the first channel Channel 0, which are assigned for the second bit (C) in the order of planes (P0→P1→P2→P3). After data are assigned for all available spaces of the first to third bits in some dies Dies 0 to 3, the following data can be transmitted into other dies Dies 4 to 7 by changing the first way Way 0 with the second way Way 1.

The third method described above can increase a size of the buffer 38 in the controller 30 in proportion to the number of channels (for example, four), like the second method. The data are transmitted to each die based on the order of the channels. As compared with the first method in which data is transmitted in a die-by-die basis, data can be transmitted by using all channels into plural dies. The data may be transmitted via a plurality of channels, not a single channel, so that data transmission may be faster. However, since data after completely delivered via a channel is delivered via the next channel, there is no overlap for data transmission between channels. Further, while data are transmitted into all dies Die 0 to 7 in the second method, data can be transmitted into some dies Dies 0 to 3 and then into the other dies Dies 4 to 7 after completely assigned for the dies Dies 0 to 3. When data are not completely assigned for all bits of all planes in all dies, it is advantageous that the third method may have lesser amounts of dummy data than the second method.

Figure 13:
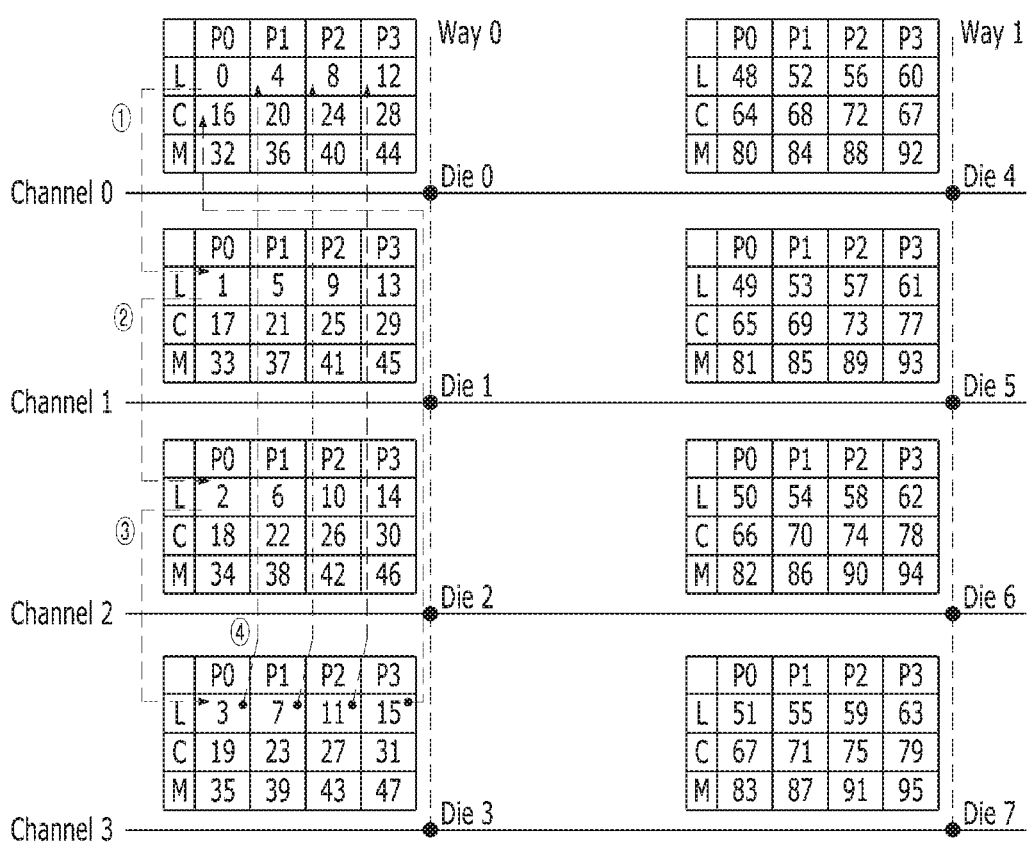

FIG. 13 illustrates a fourth method for transferring data from the controller 30 to the memory device 40.

Referring to FIG. 13, unlike the first to third methods, the fourth method provides that, after a single data is transmitted into a plane of a specific die, the following data may be transmitted into a plane of the next die. In the fourth method, the data are not assigned for all planes of each dies. In the fourth method, data can be transmitted via plural channels without changing a way so that, after the data are completely assigned for available spaces in some dies (e.g., Dies 0 to 3) of all dies Die 0 to 7, the following data can be transmitted into the other dies (e.g., Dies 4 to 7).

In each die Die 0 to 7, data can be assigned and stored according to the order of the planes (P0→P1→P2→P3) and the order of bits (the third bit (LSB, L), the second bit (CSB, C), the first bit (MSB, M), i.e., L→C→M).

In details, after data is transferred to the first plane P0 of the first die Die 0 connected to the first channel Channel 0, the channel may be changed with the next one Channel 1 according to the order of the channels to transmit the following data into the first plane (P0) of the second die Die 1, referring to the symbol (①). Unlike the first to third methods above described, the channel can be changed before all the data is transmitted to the first to fourth planes P0 to P3 included in the first die Die 0. After the data is transferred to the first plane P0 in the second die Die 1 connected to the second channel Channel 1, the following data is transferred into the first plane P0 of the third die Die 2 via the next channel Channel 2 in accordance with the order of the channels, referring to the symbol (②). After the data is delivered into the first plane P0 in the third die Die 2 connected to the third channel Channel 2, the following data is transferred into the first plane P0 of the fourth die Die 3 via the next channel Channel 3 in accordance with the order of the channels, referring to the symbol (③).

After the data is transferred to the first plane P0 in the fourth Die 3 connected to the fourth channel Channel 3, the following data can be transmitted into the second plane (P1) of the first die Die 0 connected via the first channel Channel 0, referring to the symbol (④). When data are transferred to the second plane P1 in the fourth die Die 3 according to the channel order, the following data can be transferred to the third plane P2 of the first die Die 0.

In all of the planes included in the first to fourth dies Dies 0 to 3, data can be assigned and stored according to the order of bits (the third bit (LSB, L), the second bit (CSB, C), the first bit (MSB, M), i.e., L→C→M). When data corresponding to the third bit L is transmitted to all of the planes included in the first to fourth dies Die 0 to 3, the following data corresponding to the second bit C can be transmitted. When data corresponding to the second bit C and the third bit M are all transmitted to the first to fourth dies Die 0 to 3, the way is changed from the first way Way 0 to the second way Way 1 to transfer data to the other dies Dies 4 to 7.

In summary, the sequence of access to the memory cells according to the fourth method is shown in Table 1 as follows.

TABLE 1

| Access Sequence | Channel # | Plane # | Level | Way # |
| --- | --- | --- | --- | --- |
| 0 | 0 | 0 | L | 0 |
| 1 | 1 | 0 | L | 0 |
| 2 | 2 | 0 | L | 0 |
| 3 | 3 | 0 | L | 0 |
| 4 | 0 | 1 | L | 0 |
| ... | ... | ... | ... | ... |
| 15 | 3 | 3 | L | 0 |
| 16 | 0 | 0 | C | 0 |
| ... | ... | ... | ... | ... |
| 47 | 3 | 3 | M | 0 |
| 48 | 0 | 0 | L | 1 |
| ... | ... | ... | ... | ... |

As shown in Table 1, the ways to be accessed may be changed at each completion of turns of the levels of memory cells, which to be accessed may be changed at each completion of turns of the planes, which to be accessed may be changed at each completion of turns of the channels. That is, the controller 30 may access the memory cells according to an access hierarchy of the channels, the planes, levels of the cells and the ways. Multi-level memory cells may configure logical multi-level pages. For example, triple level memory cells may configure logical triple level pages of an LSB page, a CSB page and an MSB page. The levels of memory cells may be regarded as the logical multi-level pages of those memory cells. The ways to be accessed may be changed at each completion of turns of the logical multi-level pages of memory cells. That is, the controller 30 may access the memory cells according to an access hierarchy of the channels, the planes, the logical multi-level pages and the ways.

In the fourth method described above, a size of the buffer 38 of the controller 30 can be increased in proportion to the number of channels (for example, four), like the second method. Each data can be transmitted to each die according to the order of the channels so that the fourth method has a greater effect of using a plurality of channels as compared with the first method described above in which the data are transferred to each die until completely assigned for each die. Also, as compared with the second method and the third method, since the fourth method provides that plural data can be transmitted via different channels before data is transmitted to all the planes included in a single die, data transmission between the plurality of channels may overlap so that a speed and efficiency for data transmission increase.

Figure 14:
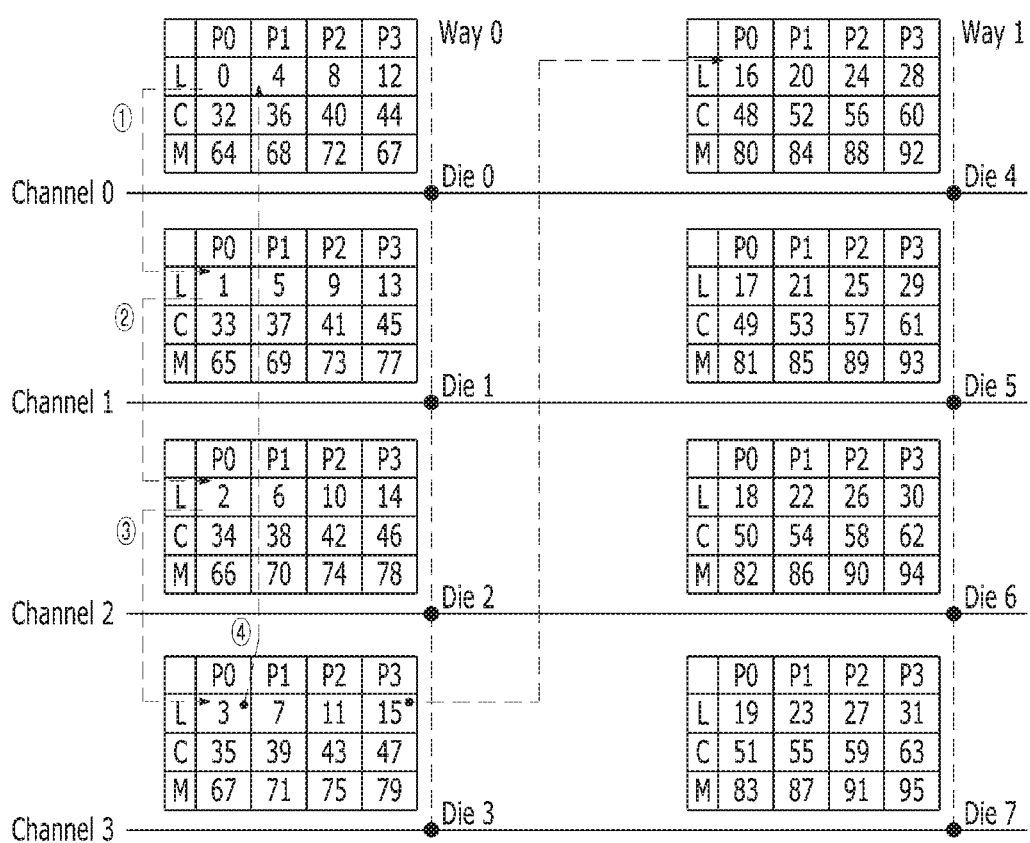

FIG. 14 illustrates a fifth method of transferring data from the controller 30 to the memory device 40.

Referring to FIG. 14, like the fourth method described above, the fifth method provides that, after a data is transmitted into a single plane of a specific die, the following data can be transmitted into a plane of another die via a next channel. In the fourth method, data are transmitted via plural channels without changing a way into some dies (e.g., Dies 0 to 3) among all Dies Die 0 to 7, and then the following data can be transmitted into other dies (e.g., Dies 4 to 7) after the data are assigned for all bits of the dies (e.g., Dies 0 to 3). Unlike the fourth method, the fifth method provides that data is transmitted into a specific bit of some dies (e.g., Dies 0 to 3), and then the following data can be transmitted into the same bit of other dies (e.g., Dies 4 to 7) by changing a way.

Specifically, in each of the dies Die 0 to 7, data can be assigned and stored according to the order of the planes (P0→P1→P2→P3) and the order of bits (the third bit (LSB, L), the second bit (CSB, C), the first bit (MSB, M), i.e., L→C→M).

After data is transferred to the first plane P0 of the first die Die 0 connected to the first channel Channel 0, the channel may be changed with the next one Channel 1 according to the order of the channels to transmit the following data into the first plane (P0) of the second die Die 1, referring to the symbol (①). Unlike the first to third methods above described, the channel can be changed before all of the data is transmitted to the first to fourth planes P0 to P3 included in the first die Die 0. After the data is transferred to the first plane P0 in the second die Die 1 connected to the second channel Channel 1, the following data is transferred into the first plane P0 of the third die Die 2 via the next channel Channel 2 in accordance with the order of the channels, referring to the symbol (②). After the data is delivered into the first plane P0 in the third die Die 2 connected to the third channel Channel 2, the following data is transferred into the first plane P0 of the fourth die Die 3 via the next channel Channel 3 in accordance with the order of the channels, referring to the symbol (③).

After the data is transferred to the first plane P0 in the fourth Die 3 connected to the fourth channel Channel 3, the following data can be transmitted into the second plane (P1) of the first die Die 0 connected via the first channel Channel 0, referring to the symbol (④). When data are transferred to the second plane P1 in the fourth die Die 3 according to the channel order, the following data can be transferred to the third plane P2 of the first die Die 0.

When data corresponding to the third bit L are transferred to all of the planes included in the first to fourth dies Dies 0 to 3, the way is changed (Way 0→Way 1). The following data assigned for the third bit L can be transmitted to all of the planes included in the fifth to eighth dies Dies 4 to 7. When data are transferred to the third bit (L) on all of the planes on all of the dies Die 0 to 7, the following data assigned for the second bit (C) can be transmitted. In all of the planes included in the all of the dies Dies 0 to 7, data can be assigned and stored according to the order of bits (the third bit (LSB, L), the second bit (CSB, C), the first bit (MSB, M), i.e., L→C→M).

In summary, the sequence of access to the memory cells according to the fifth method is shown in Table 2 as follows.

TABLE 2

| Access Sequence | Channel # | Plane # | Way # | Level |
| --- | --- | --- | --- | --- |
| 0 | 0 | 0 | 0 | L |
| 1 | 1 | 0 | 0 | L |
| 2 | 2 | 0 | 0 | L |
| 3 | 3 | 0 | 0 | L |
| 4 | 0 | 1 | 0 | L |
| ... | ... | ... | ... | ... |
| 15 | 3 | 3 | 0 | L |
| 16 | 0 | 0 | 1 | L |
| ... | ... | ... | ... | ... |
| 31 | 3 | 3 | 1 | L |
| 32 | 0 | 0 | 0 | C |
| ... | ... | ... | ... | ... |

As shown in Table 2, the levels of memory cells to be accessed may be changed at each completion of turns of the ways, which to be accessed may be changed at each completion of turns of the planes, which to be accessed may be changed at each completion of turns of the channels. That is, the controller 30 may access the memory cells according to an access hierarchy of the channels, the planes, the ways and levels of the cells. The levels of memory cells may be regarded as the logical multi-level pages of those memory cells. The logical multi-level pages of memory cells to be accessed may be changed at each completion of turns of the ways. That is, the controller 30 may access the memory cells according to an access hierarchy of the channels, the planes, the ways and the logical multi-level pages.

In the fifth method described above, a size of the buffer 38 included in the controller 30 can be increased in proportion to the number of channels (for example, four), like the fourth method. The data is transmitted to each die according to the order of the channels so that the fifth method has a greater effect on data transmission speed by sequentially using plural channels as compared to the first method described above in which the data is transferred to all bits of all planes of each die and then transmitted to the next die. Further, since the fifth method can use plural channels to transmit data into plural dies before data is transmitted to all the planes included in a single die as compared with the second method and the third method, data transmission via a plurality of channels can be overlapped so that data transmission speed and efficiency can be increased and enhanced. In the fifth method, unlike the fourth method, data are sequentially transmitted into all of the dies Die 0 to 7 rather than to some dies (e.g., Dies 0 to 3). Therefore, when the dies Die 0 to 7 are not filled with data, dummy data can be increased.

Figure 15:
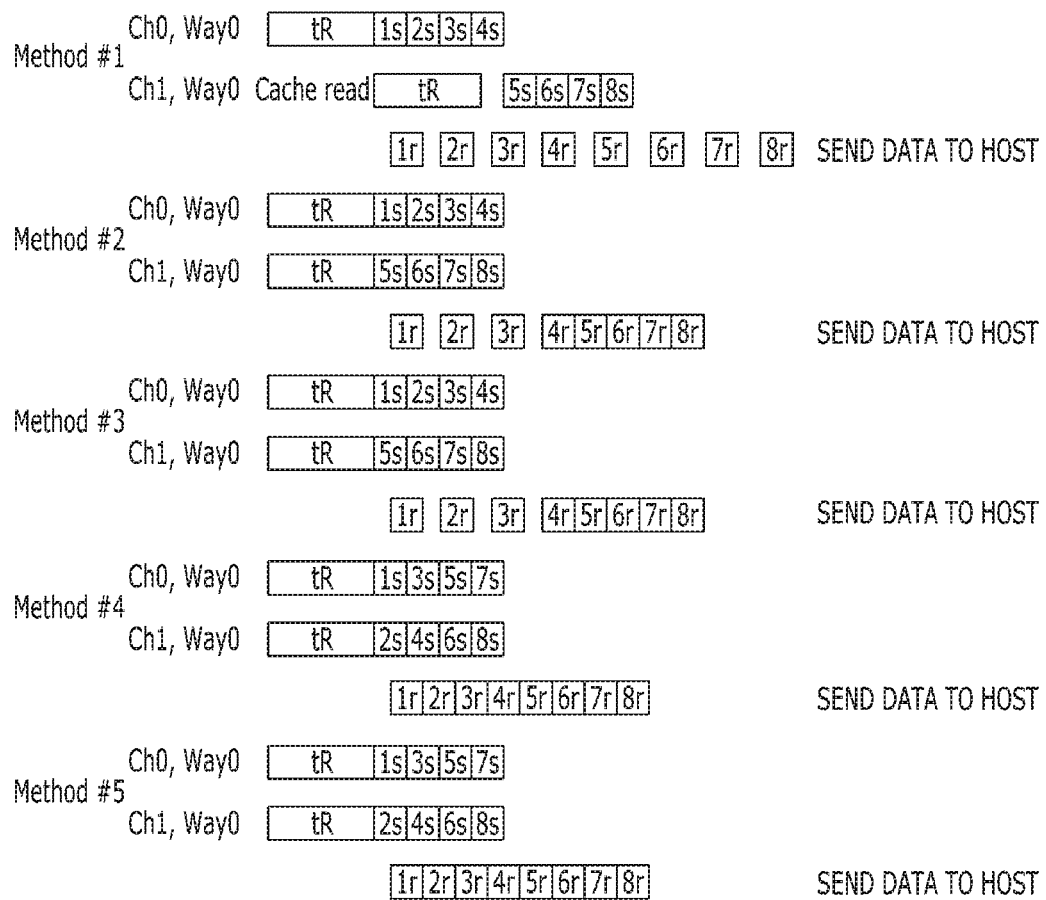
FIGS. 15 and 16 are diagrams illustrating effects of the first to fifth methods described in FIGS. 10 to 14.
Figure 16:
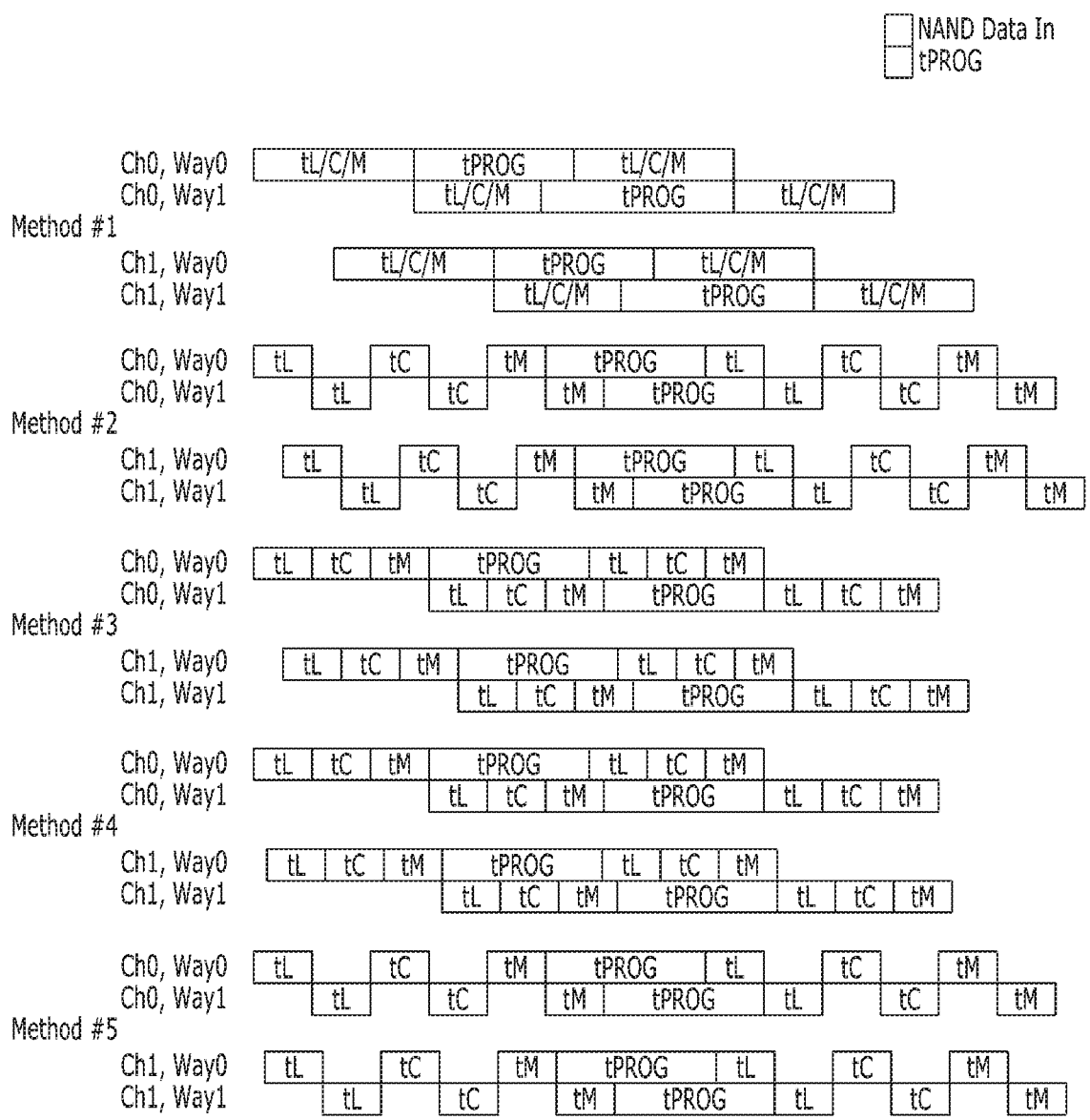

FIGS. 15 and 16 illustrate effects of the first to fifth methods described in FIGS. 10 to 14. FIG. 15 compares speeds in read operations according to the first to fifth methods. FIG. 16 compares speeds in write operations according to the first to fifth methods. In FIGS. 15 and 16, it is assumed that four dies are coupled with a controller through two channels and two ways. It is also assumed that a second time for transferring data between a host and a memory system is about twice as fast (e.g., 2.1 times) than a first time required for transferring data between the controller and a memory device in the memory system.

Referring to FIG. 15, in the first to fifth methods, there is no difference between read times (tR) required for reading data from the memory device, between first times (1s to 8s) for transferring data from the memory device to the controller, and between second times (1r to 8r) for data from the memory system to the host. However, the read times (tR), the first times (1s to 8s) and the second times (1r to 8r) can be arranged differently according to the first to fifth methods.

Even if times spent on specific operations in a memory system or between the memory system and the host are substantially same, the specific operations can be carried out at different timings according to the first to fifth methods. The difference in the performance of the specific operations may causes a difference in total times for outputting data from the four dies through two channels and two ways.

In FIG. 15, it is described that the four dies are coupled via two channels and two ways. However, in a memory system in which the number of channels is increased and the number of dies is increased, there can be a larger difference in the total time when larger data is read in accordance with the first to fifth methods.

Referring to FIG. 16, times tPROG required for writing data in each memory cells and the times (tL/C/M, tL, tC, tM) for transmitting data between the memory device and the controller are arranged differently according to the first to fifth methods for transferring data. According to the first to fifth methods, a difference occurs in total times required to transfer the data to the four dies via two channels and two ways. In FIG. 16, it is described that the four dies are coupled via two channels and two ways. However, when a memory system includes more channels and more dies, more differences can exist in the total time than when larger data is read in accordance with the first to fifth methods.

As described above, not only is there a two-fold difference between a first rate at which data is transferred between the controller and the memory device within the memory system and a second rate at which data is transferred between the host and the memory system, but also a time (tPROG or tR) for writing or reading data to or from the memory device is greater than a time for transferring data among the host, the controller and the memory device. Thus, how to transmit data among the host, the controller and the memory device can affect overall performance of the memory system (e.g., I/O throughput). In addition, errors may be reduced in the process of transmitting data at a high speed by reducing interference even though data transmission via plural channels can overlap each other.

Figure 17:
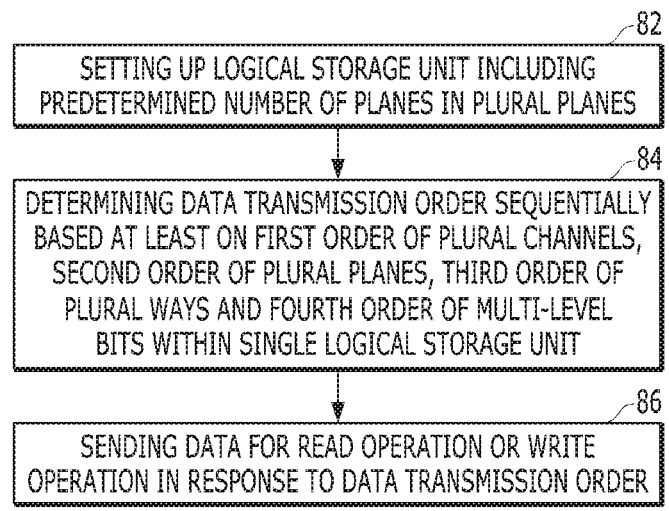
FIG. 17 is a flow chart illustrating an operational method for transferring data in a memory system.

FIG. 17 shows an operation method for transferring data in a memory system.

Referring to FIG. 17, the operation method for data transfer can include setting a predetermined number of planes in plural planes as a logical storage unit (step 82), determining a transmission order of data based on a first order of plural channels, a second order of the plural planes, a third order of plural ways and a fourth order of bits stored in multi-level cell (step 84), and transmitting the data to the at least one memory device in response to the transmission order (step 86).

The memory system may include at least one memory device capable of storing data and a controller for performing a read or write operation in the at least one memory device. Dies in a memory device connected to a controller through a plurality of channels and a plurality of ways in a memory system may include a plurality of planes. The plane may include a plurality of blocks, and the block may include a plurality of cells. A cell may store a multi-level (multi-bit) data. For example, the cell may include a triple level cell (TLC) capable of storing 3-bit data, or a quad level cell (QLC) capable of storing 4-bit data.

In accordance with the embodiment, the controller in the memory system can perform each read operation or each write operation in each logical storage unit set in the memory device.

The controller included in the memory system can be engaged with a mapping unit capable of determining the transmission order of data. The transmission order of data may be determined by applying a first order of the plural channels, a second order of plural planes, a third order of plural ways, and a fourth order of the bits stored in the multi-level cells with different priorities. For example, the controller may change the first order after data are transferred to at least one die based on the second order, in order to determine the transmission order of data through the mapping unit.

In accordance with an embodiment, in determining the transmission order of data, the controller may change the second order after the transfer of data based on the first order is made. After completely transmitting data to at least one die based on the second order, the controller can change the third order for data transmission. Then, the fourth order may be changed after data are transferred to at least one die based on the third order. For example, the controller 30 may access the memory cells according to an access hierarchy of the channels, the planes, the ways and the logical multi-level pages in the order listed, as described with reference to Table 2.

In accordance with an embodiment, in determining the transfer order of the data, the controller can change the fourth order after data are transferred to at least one die based on the second order. After data are transferred to at least one die based on the fourth order, the controller can change the third order. For example, the controller 30 may access the memory cells according to an access hierarchy of the channels, the planes, the logical multi-level pages and the ways in the order listed, as described with reference Table 1.

In addition, the controller can use, or refer to, the mapping unit to determine the transmission order of data based on the first order, the second order, the third order, and the fourth order, according to a size of data transferred to or from one or more logical storage units. The transmission order may be adjusted or changed by a data size.

Adjusting priorities of the first order, the second order, the third order, and the fourth order may bring about different performance and effects, as the first to fifth methods described in FIGS. 10 to 14.

Figure 18:
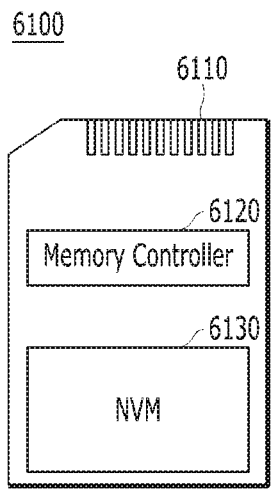
FIGS. 18 to 26 are diagrams schematically illustrating other examples of data processing systems including a memory system in accordance with embodiments of the invention.

In FIG. 18, another example of the data processing system including the memory system in accordance with an embodiment is described. FIG. 18 schematically illustrates a memory card system to which the memory system is applied.

Referring to FIG. 18, the memory card system 6100 may include a memory controller 6120, a memory device 6130 and a connector 6110.

The memory controller 6120 may be connected to the memory device 6130 embodied by a nonvolatile memory. The memory controller 6120 may be configured to access the memory device 6130. By way of example and not limitation, the memory controller 6120 may be configured to control read, write, erase and background operations of the memory device 6130. The memory controller 6120 may be configured to provide an interface between the memory device 6130 and a host, and use a firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a RAM, a processor, a host interface, a memory interface and an error correction component. The memory controller 6120 may further include the elements shown in FIG. 1.

The memory controller 6120 may communicate with an external device, for example, the host 102 of FIG. 1 through the connector 6110. For example, as described with reference to FIG. 1, the memory controller 6120 may be configured to communicate with an external device according to one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system may be applied to wired/wireless electronic devices, particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-MRAM). The memory device 6130 may include a plurality of dies as in the memory device 150 of FIG. 6.

The memory controller 6120 and the memory device 6130 may be integrated into a single semiconductor device. For example, the memory controller 6120 and the memory device 6130 may be so integrated to form a solid state driver (SSD). In another embodiment, the memory controller 6120 and the memory device 6130 may be integrated to form a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC) and/or a universal flash storage (UFS).

Figure 19:
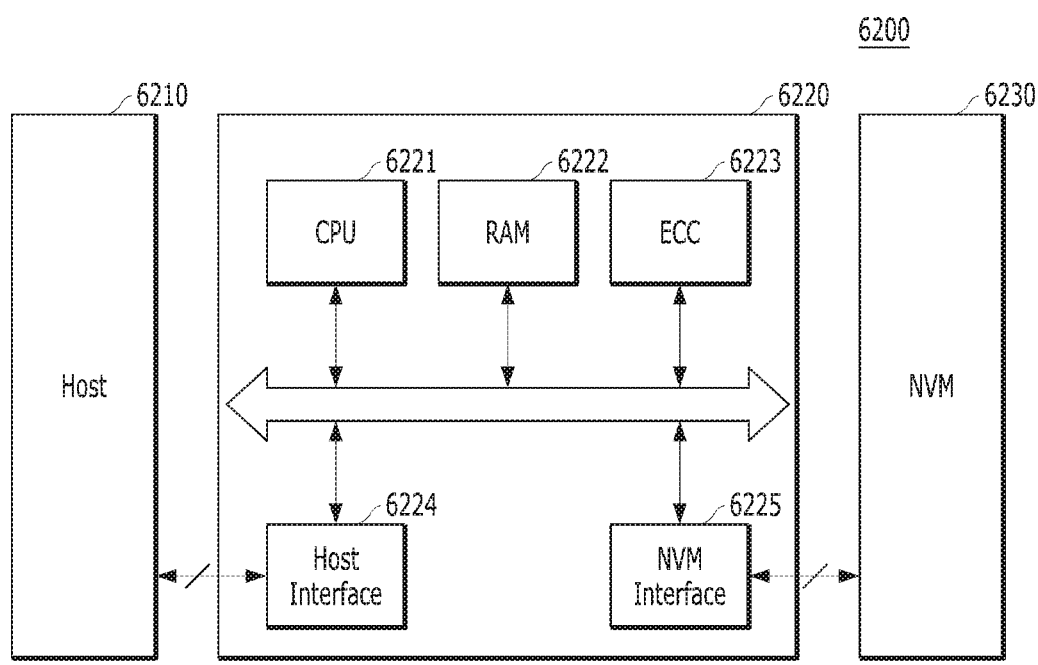

FIG. 19 is a diagram schematically illustrating another example of the data processing system including the memory system in accordance with an embodiment.

Referring to FIG. 19, the data processing system 6200 may include a memory device 6230 having one or more nonvolatile memories and a memory controller 6220 for controlling the memory device 6230. The data processing system 6200 illustrated in FIG. 19 may serve as a storage medium such as a memory card (CF, SD, micro-SD or the like) or USB device, as described with reference to FIG. 1. The memory device 6230 may correspond to the memory device 150 in the memory system 110 illustrated in FIG. 1. The memory controller 6220 may correspond to the controller 130 in the memory system 110 illustrated in FIG. 1.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management, and bad page management operations. The RAM 6222 may be operated according to control of the CPU 6221. The RAM 6222 may be used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may exchange data with the host 6210 through the host interface 6224. The memory controller 6220 may exchange data with the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then exchange data with the external device. Particularly, as the memory controller 6220 is configured to communicate with the external device through one or more of various communication protocols, the memory system and the data processing system in accordance with an embodiment may be applied to wired/wireless electronic devices, particularly a mobile electronic device.

Figure 20:
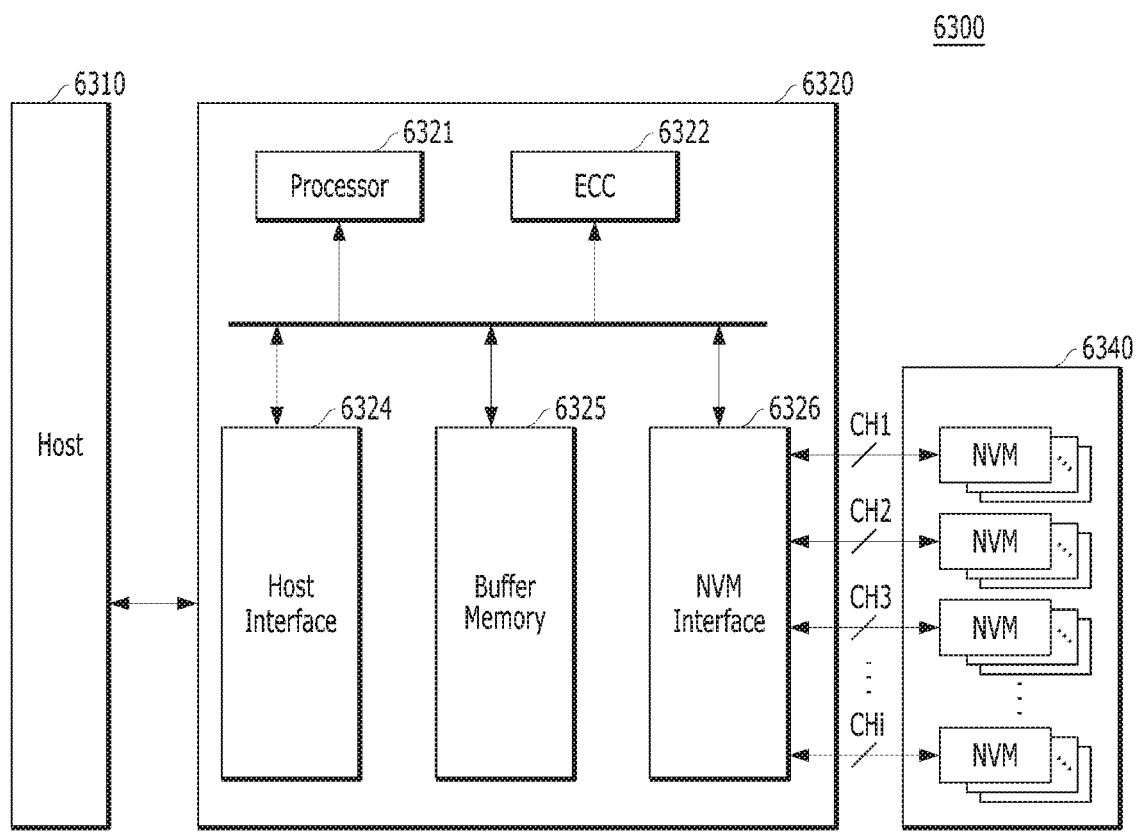

FIG. 20 is a diagram schematically illustrating another example of the data processing system including the memory system in accordance with an embodiment. FIG. 20 schematically illustrates an SSD to which the memory system is applied.

Referring to FIG. 20, the SSD 6300 may include a controller 6320 and a memory device 6340 including a plurality of nonvolatile memories. The controller 6320 may correspond to the controller 130 in the memory system 110 of FIG. 1. The memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324, and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by any of various volatile memories such as DRAM, SDRAM, DDR SDRAM, LPDDR SDRAM and GRAM or nonvolatile memories such as FRAM, ReRAM, STT-MRAM and PRAM. FIG. 20 illustrates that the buffer memory 6325 is disposed in the controller 6320. However, the buffer memory 6325 may be disposed externally to the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

Figure 21:
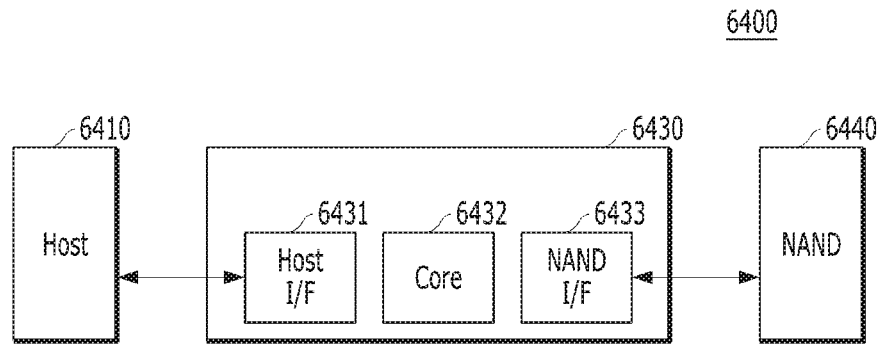

FIG. 21 is a diagram schematically illustrating another example of the data processing system including the memory system in accordance with an embodiment. FIG. 21 schematically illustrates an embedded Multi-Media Card (eMMC) to which the memory system is applied.

Referring to FIG. 21, the eMMC 6400 may include a controller 6430 and a memory device 6440 embodied by one or more NAND flash memories. The controller 6430 may correspond to the controller 130 in the memory system 110 of FIG. 1. The memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 22 to 25 are diagrams schematically illustrating other examples of the data processing system including the memory system in accordance with embodiments. FIGS. 22 to 25 schematically illustrate UFS (Universal Flash Storage) systems to which the memory system is applied.

Referring to FIGS. 22 to 26, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices, particularly mobile electronic devices through UFS protocols, and the UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 19 to 21, and the UFS cards 6530, 6630, 6730, 6830 may be embodied in the form of the memory card system 6100 described with reference to FIG. 18.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, for example, an UFDs, a MMC, a SD, a mini-SD, and a micro-SD.

Figure 22:
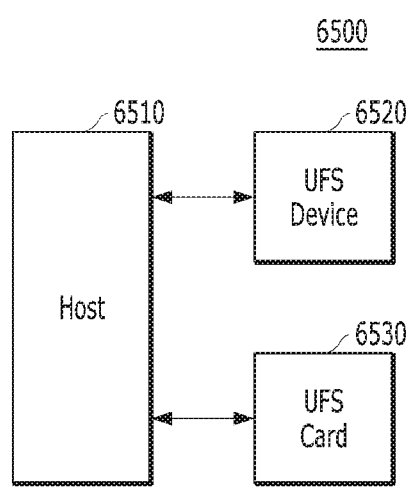

In the UFS system 6500 illustrated in FIG. 22, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the embodiment of FIG. 22, the configuration in which one UFS device 6520 and one UFS card 6530 are connected to the host 6510 is illustrated by way of example. However, in another embodiment, a plurality of UFS devices and UFS cards may be connected in parallel or in the form of a star to the host 6510. The form of a star is an arrangement where a single centralized component is coupled to plural devices for parallel processing. A plurality of UFS cards may be connected in parallel or in the form of a star to the UFS device 6520 or connected in series or in the form of a chain to the UFS device 6520.

Figure 23:
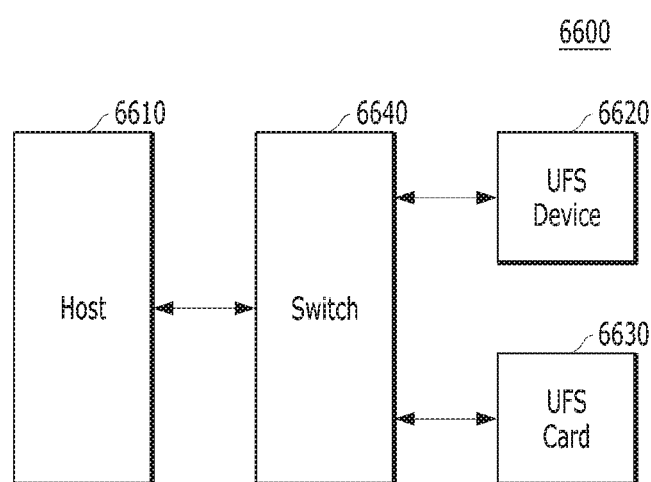

In the UFS system 6600 illustrated in FIG. 23, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the embodiment of FIG. 23, the configuration in which one UFS device 6620 and one UFS card 6630 are connected to the switching module 6640 is illustrated by way of example. However, in another embodiment, a plurality of UFS devices and UFS cards may be connected in parallel or in the form of a star to the switching module 6640, and a plurality of UFS cards may be connected in series or in the form of a chain to the UFS device 6620.

Figure 24:
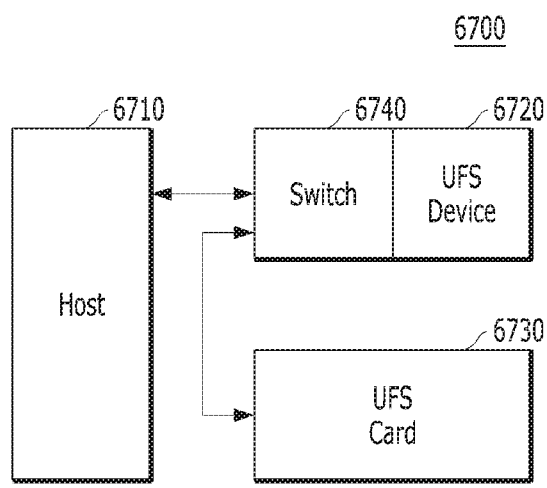

In the UFS system 6700 illustrated in FIG. 24, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the embodiment of FIG. 24, the configuration in which one UFS device 6720 and one UFS card 6730 are connected to the switching module 6740 is illustrated by way of example. However, in another embodiment, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 25:
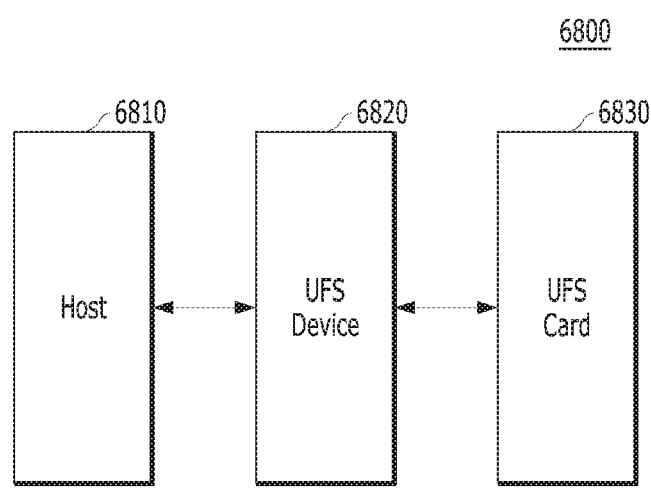

In the UFS system 6800 illustrated in FIG. 25, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the embodiment of FIG. 25, the configuration in which one UFS device 6820 is connected to the host 6810 and one UFS card 6830 is connected to the UFS device 6820 is illustrated by way of example. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 26:
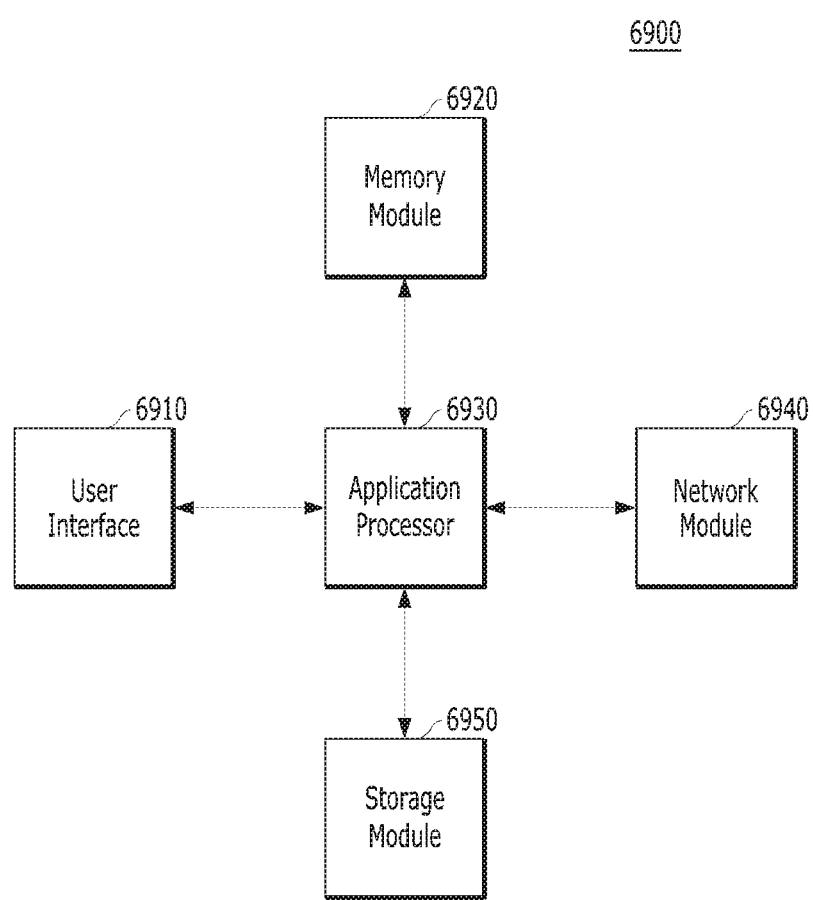

FIG. 26 is a diagram schematically illustrating another example of the data processing system including the memory system in accordance with an embodiment of the disclosure. FIG. 26 is a diagram schematically illustrating a user system to which the memory system is applied.

Referring to FIG. 26, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR2 SDRAM or LPDDR3 SDRAM or a nonvolatile RAM such as PRAM, ReRAM, MRAM or FRAM. For example, the application processor 6930 and the memory module 6920 may be packaged and mounted, based on P0P (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the disclosure, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, an eMMC and an UFS as described above with reference to FIGS. 20 to 25.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a monitor.

Furthermore, when the memory system 110 of FIG. 1 is applied to a mobile electronic device of the user system 6900, the application processor 6930 may control overall operations of the mobile electronic device. The network module 6940 may serve as a communication module for controlling wired/wireless communication with an external device. The user interface 6910 may display data processed by the application processor 6930 on a display/touch module of the mobile electronic device. Further, the user interface 6910 may support a function of receiving data from the touch panel.

A memory system, a data processing system and an operation method thereof in accordance with embodiments of the disclosure can provide an apparatus and a method for parallel data transfer therein via a plurality of channels or a plurality of ways therein, to enhance efficiency of data transmission.

The disclosure can provide an apparatus and a method for performing data transfer in a memory system quickly and effectively so that it can be easy for the memory system to secure a window for writing or reading data to or from a nonvolatile memory cell in a memory device. The reliability of data transfer procedure can be improved.

While the disclosure illustrates and describes specific embodiments, it will be apparent to those skilled in the art in light of the present disclosure that various changes and modifications may be made without departing from the spirit and scope of the invention as defined in the following claims.

What is claimed is:
1. A memory system comprising:
at least one memory device, including plural planes, each capable of storing data; and
a controller coupled with the at least one memory device via plural channels and plural ways, and suitable for selecting multi-level cells within the at least one memory device for a read operation or a write operation in response to plural hierarchies of an order of access,
wherein the plural planes include plural blocks, respectively, and the plural blocks include the multi-level cells comprising plural bits, respectively, and
wherein the controller includes a mapping circuitry for determining the plural hierarchies of an order of access to the plural channels, the plural ways, the plural planes and the plural bits,
wherein the plural hierarchies of the order of access can be varied by changing the sequence of the order of access to the plural channels, the plural ways, the plural planes and the plural bits according to a size of data transmitted from or to the at least one memory device.

2. The memory system according to claim 1,
wherein the controller sets a predetermined number of the plural planes as a logical storage unit, and
wherein the read operation or the write operation is performed on a logical storage unit basis.

3. The memory system according to claim 2, wherein the mapping circuitry sequentially determines the plural hierarchies of an order of access in each logical storage unit.

4. The memory system according to claim 3,
wherein the at least one memory device includes a first buffer for temporarily storing data having a size corresponding to that of the logical storage unit, and
wherein the controller includes a second buffer for storing data larger than that of the first buffer.

5. The memory system according to claim 3, wherein the mapping circuitry changes a channel after at least one plane is accessed based on the plural hierarchies of an order of access.

6. The memory system according to claim 5, wherein the mapping circuitry changes a way after a channel is accessed, and changes a bit after a way is accessed based on the plural hierarchies of an order of access.

7. The memory system according to claim 5, wherein the mapping circuitry changes a bit after a channel is accessed, and changes a way after at least one bit is accessed based on the plural hierarchies of an order of access.

8. The memory system according to claim 3, wherein the mapping circuitry changes a plane after a channel is accessed based on the plural hierarchies of an order of access.

9. The memory system according to claim 8, wherein the mapping circuitry changes a way after at least one plane is accessed, and changes a bit after a way is accessed based on the plural hierarchies of an order of access.

10. The memory system according to claim 8, wherein the mapping circuitry changes a bit after at least one plane is accessed, and changes a way after at least one bit is accessed based on the plural hierarchies of an order of access.

11. The memory system according to claim 1, wherein the mapping circuitry is included in a memory interface engaged with the at least one memory device.

12. The memory system according to claim 1, wherein the mapping circuitry is included in a host interface engaged with a host or an external device.

13. (A method for operating a memory system including at least one memory device, including plural planes, each capable of storing data, and a controller coupled with the at least one memory device via plural channels and plural ways, and suitable for performing a read operation or a write operation, wherein the plural planes include plural blocks respectively and the plural blocks include multi-level cells comprising plural bits, respectively, the method comprising:
determining plural hierarchies of an order of access to the plural channels, the plural ways, the plural planes and the plural bits; and
accessing the plural bits within the at least one memory device in response to the plural hierarchies of an order of access,
wherein the plural hierarchies of the order of access can be varied by changing the sequence of the order of access to the plural channels, the plural ways, the plural planes and the plural bits according to a size of data transmitted from or to the at least one memory device.

14. The method according to claim 13, further comprising:
setting a determined number of the plural planes as a logical storage unit, and performing the read operation or the write operation on a logical storage unit basis.

15. The method according to claim 14, wherein the plural hierarchies of an order of access are determined sequentially in each logical storage unit.

16. The method according to claim 15, wherein, a channel is changed after at least one plane is accessed based on the plural hierarchies of an order of access.

17. The method according to claim 15, wherein, a plane is changed after a channel is accessed based on the plural hierarchies of an order of access.

18. The method according to claim 11, wherein, a way is changed after at least one plane is accessed, and a bit is changed after a way is accessed based on the plural hierarchies of an order of access.

19. The method according to claim 17, wherein, a bit is changed after at least one plane is accessed, and a way is changed after at least one bit is accessed based on the plural hierarchies of an order of access.

* * * * *